(12) United States Patent
Anderson et al.

(10) Patent No.: US 11,263,596 B2
(45) Date of Patent: Mar. 1, 2022

(54) METHODS AND SYSTEMS FOR DISPATCHING ASSISTANCE TO ROBOTS

(71) Applicant: A&K Robotics Inc., Vancouver (CA)

(72) Inventors: Matthew Henry Anderson, Vancouver (CA); Jessica Hil-Yin Yip, Burnaby (CA); Anson Yan Shun Kung, Richmond (CA); Ranjit Singh Khangura, Surrey (CA); Bikram Adhikari, Vancouver (CA); Alexander Joseph Yuen, Richmond (CA)

(73) Assignee: A&K Robotics Inc., Vancouver (CA)

( * ) Notice: Subject to any disclaimer, the term of this patent is extended or adjusted under 35 U.S.C. 154(b) by 709 days.

(21) Appl. No.: 15/859,886

(22) Filed: Jan. 2, 2018

(65) Prior Publication Data
US 2018/0189748 A1   Jul. 5, 2018

Related U.S. Application Data

(60) Provisional application No. 62/441,919, filed on Jan. 3, 2017.

(51) Int. Cl.
*G06Q 10/00* (2012.01)
*G06Q 10/06* (2012.01)
(Continued)

(52) U.S. Cl.
CPC ............ *G06Q 10/20* (2013.01); *B25J 9/0084* (2013.01); *B25J 9/1674* (2013.01); *G06Q 10/06311* (2013.01)

(58) Field of Classification Search
None
See application file for complete search history.

(56) References Cited

U.S. PATENT DOCUMENTS

| | | | |
|---|---|---|---|
| 7,937,283 B2 * | 5/2011 | Tyni | G06Q 10/063 705/7.13 |
| 8,886,390 B2 | 11/2014 | Wolfe et al. | |

(Continued)

FOREIGN PATENT DOCUMENTS

| | | |
|---|---|---|
| CN | 107025488 | 8/2017 |
| JP | 2003067021 | 3/2003 |

OTHER PUBLICATIONS

Bannatetal, Artificial Cognition in Production Systems, 2010 (Year: 2010).*

*Primary Examiner* — Mohamed N El-Bathy
(74) *Attorney, Agent, or Firm* — Todd A. Rattray; Oyen Wiggs Green & Mutala LLP

(57) ABSTRACT

Methods, systems, and techniques are disclosed for selecting and dispatching a worker to assist a robot. The system may include a computer comprising a processor and a computer readable memory. The computer readable memory may include lists of worker criteria items for a plurality of workers and a list of assistance criteria items for a robot. The system may include a triggering application executable by the processor for identifying triggering data corresponding to a triggering item within sensor data from the robot. A ranking application may also be stored on the computer and may be executed in response to an identification of triggering data corresponding to the triggering item. The ranking application may be operable to cross-reference the worker criteria items on each of the first lists with the assistance criteria items on the second list and to generate a ranking of the plurality of workers based on the cross-referencing.

17 Claims, 8 Drawing Sheets

(51) Int. Cl.
  *B25J 9/00*   (2006.01)
  *B25J 9/16*   (2006.01)

(56) References Cited

U.S. PATENT DOCUMENTS

| | | |
|---|---|---|
| 9,805,519 B2 | 10/2017 | Ramanujam |
| 2005/0060217 A1 | 3/2005 | Douglas et al. |
| 2006/0059490 A1 | 3/2006 | Knapp et al. |
| 2008/0066072 A1* | 3/2008 | Yurekli .................. G06Q 10/06 718/104 |
| 2008/0275754 A1 | 11/2008 | Mugisa |
| 2011/0208567 A9* | 8/2011 | Roddy .................... G06Q 10/20 705/7.41 |
| 2011/0295636 A1 | 12/2011 | Anderson |
| 2014/0032281 A1 | 1/2014 | Shirado et al. |
| 2014/0172482 A1* | 6/2014 | Mitchell .......... G06Q 10/06311 705/7.15 |
| 2016/0107620 A1 | 4/2016 | Humphrey |
| 2016/0149996 A1 | 5/2016 | Eckert et al. |
| 2016/0334230 A1 | 11/2016 | Ross et al. |
| 2017/0029214 A1 | 2/2017 | Johnson et al. |
| 2017/0124676 A1 | 5/2017 | Kreitzer et al. |
| 2017/0282371 A1 | 10/2017 | Erhart et al. |
| 2017/0286916 A1* | 10/2017 | Skiba ...................... H04L 67/42 |

\* cited by examiner

METHODS AND SYSTEMS FOR DISPATCHING ASSISTANCE TO ROBOTS

RELATED APPLICATIONS

This application claims the benefit under 35 USC 119 of U.S. application No. 62/441,919 filed 3 Jan. 2017 which is hereby incorporated herein by reference.

TECHINCAL FIELD

The present disclosure relates to robots, and in particular, to a dispatch system for assisting robots.

BACKGROUND

Automated systems, such as robots, have been widely used in a range of industries, such as automobile manufacturing, for many years. More recently, robotic systems have begun to be used in the cleaning industry. Machines such as scrubbers and vacuum cleaners have been automated for autonomous use. Autonomous use of cleaning machines provides cost savings over human operated machines and greater predictability in the amount of time and materials spent. Autonomous cleaning machines may work for greater durations than human workers. Using autonomous cleaning machines, or robots, also avoids the costs of training new personnel due to high turn-over rates in the cleaning industry.

Multiple robots or fleets of robots may also be used for janitorial work. For example, multiple autoscrubbers may be used to clean a large facility, such as an airport or a hospital. Multiple robots may be managed individually or as a group.

There exists a continuing desire to advance and improve technology related to robots.

SUMMARY

According to one aspect, there is provided a system for generating a ranking of workers, from among a plurality of workers, to assist a robot. The system may include a computer comprising a processor and a computer readable memory, a triggering application executable by the processor for identifying triggering data corresponding to a triggering item within sensor data from a robot, a corresponding first list of worker criteria items stored on the computer-readable memory for each of the plurality of workers, a second list of assistance criteria items for the robot stored on the computer-readable memory, where the assistance criteria items are based on the sensor data from the robot, and a ranking application executable by the processor in response to an identification of triggering data corresponding to the triggering item by the triggering application. The ranking application may be operable to cross-reference the worker criteria items on each of the first lists with the assistance criteria items on the second list and to generate a ranking of the plurality of workers based on the cross-referencing.

The system may also include a sensor coupled to the robot and the sensor data may be based on data from the sensor. The sensor may comprise a robot processor coupled to the robot.

The triggering application may comprise a matching routine for matching the sensor data to a triggering data set from a triggering list. The triggering item may correspond to the triggering data set.

The ranking application may comprise a cross-referencing routine for identifying matches between the worker criteria items on each of the first lists with corresponding assistance criteria items on the second list.

The cross-referencing routine may comprise a tallying module for tallying matches between each of the first lists and the second list and assigning a rank to each of the plurality of workers within the ranking based on the number of matches tallied for each corresponding first list.

The worker criteria items for each of the first lists may comprise configurable relative weight values. For each of the first lists, the configurable relative weight values of the worker criteria items may be adjustable by the ranking application to adjusted relative weight values based on matches between the worker criteria items on the first list and corresponding assistance criteria items on the second list.

The ranking application may comprise a default ranking module for providing a top ranking for one of the workers corresponding to the one of the plurality of first lists based on a match of a default assistance criteria item on the second list with a corresponding worker criteria item on one of the plurality of first lists.

A location of each worker may be a worker criteria item on each corresponding first list. A location of the robot may be an assistance criteria item on the second list.

The system may also include a notification application executable by the processor in response to the ranking application generating a ranking of the plurality of workers for automatically notifying a top ranked one of the plurality of workers of an assistance request from the robot.

The notification application may comprise a second notification routine for notifying a second one of the plurality of workers of an assistance request from the robot and of the location of the robot in response to the top ranked worker not accepting the assistance request.

The notification application may comprise a time module for notifying the second one of the plurality of workers of a time within which to accept the assistance request.

The notification application may comprise a location module for notifying the top ranked worker of the location of the robot.

The robot may be a janitorial services robot.

At least one assistance criteria item on the second list may comprise a fluid spraying system.

At least one worker criteria item on the first list for at least one of the plurality of workers may be a skill for resolving malfunctions in the janitorial services robot.

At least one worker criteria item on the first list of worker criteria items for at least one of the plurality of workers may be a tool for servicing a janitorial services robot.

The computer may be coupled to the robot.

According to another aspect, there is provided a dispatch method for selecting a worker, from among a plurality of workers, to assist a robot. The dispatch method includes providing sensor data, where the sensor data is based on data from a sensor coupled to a robot, analyzing the sensor data to identify triggering data corresponding to a triggering item within the sensor data, providing, for each of the plurality of workers, a corresponding first list of worker criteria items stored on a computer-readable memory of a computer, providing a second list of assistance criteria items for a robot stored on the computer readable memory of the computer, cross-referencing, in response to an identification of trigger data within the sensor data, worker criteria items on each of the first lists with assistance criteria items on the second list, ranking the plurality of workers based on the cross-referencing to thereby generate a ranking of the plurality of workers based on the cross-referencing, where the ranking is stored on the computer-readable memory, and automatically sending, in response to the ranking, a notification of an assistance request by the robot to a notification terminal of a first ranked worker from among the plurality of workers in the ranking.

Analyzing sensor data to identify triggering data may comprise matching sensor data to triggering data in a triggering data set from a triggering list. The triggering item may correspond to the triggering data set.

The sensor may comprise a robot processor coupled to the robot.

The dispatch method may also include adding one or more assistance criteria items corresponding to the sensor data to the list of assistance criteria items.

Cross-referencing may comprise matching worker criteria items on each of the first lists with corresponding assistance criteria items on the second list.

Ranking may comprise tallying the number of matches for each of the first lists and giving a top rank to at least one worker of the plurality of workers based on the number of matches tallied for the first list corresponding to the one worker of the plurality of workers.

The dispatch method may also include assigning relative weight values to worker criteria items on each of the first lists.

The dispatch method may also include adjusting the relative weight values based on matches between worker criteria items on each of the first lists and corresponding assistance criteria items on the second list.

The dispatch method may also include selecting one worker of the plurality of workers for notification by default when a worker criteria item on the first list corresponding to the one worker of the plurality of workers matches a corresponding default item on the second list.

The dispatch method may also include sending a second notification of the assistance request to a second ranked worker of the plurality of workers, wherein the second notification is sent in response to the first ranked worker not accepting the assistance request.

The dispatch method may also include receiving from a notified worker a conditional acceptance of the assistance request, wherein the conditional acceptance comprises a time component indicative of when the notified worker may provide assistance to the robot.

The dispatch method may also include automatically notifying another worker of the assistance request and the conditional acceptance in response to receiving a conditional acceptance.

The dispatch method may also include adding a location of each worker of the plurality of workers to the first list corresponding to each worker. The dispatch method may also include adding a location of the robot to the second list.

The robot may be a janitorial services robot.

The dispatch method may also include adding a skill for resolving malfunctions in the janitorial services robot as a worker criteria item on at least one of the first lists.

The dispatch method may also include adding a tool for servicing a janitorial services robot as a worker criteria item on at least one of the first lists.

The dispatch method may also include adding a fluid spraying system as an assistance criteria item on the second list.

The computer may be coupled to the robot.

According to another aspect, there is provided a computer program product for selecting a worker to assist a robot. The computer program product may comprise a non-transitory computer-readable medium having computer-readable code embodied therein executable by a processor for performing a dispatch method for selecting a worker to assist a robot. The dispatch method may include providing sensor data, wherein the sensor data is based on data from a sensor coupled to a robot, analyzing the sensor data to identify triggering data corresponding to a triggering item within the sensor data, providing, for each of the plurality of workers, a corresponding first list of worker criteria items stored on a computer-readable memory of a computer, providing a second list of assistance criteria items for a robot stored on the computer readable memory of the computer, cross-referencing, in response to an identification of trigger data within the sensor data, worker criteria items on each of the first lists with assistance criteria items on the second list, ranking the plurality of workers based on the cross-referencing to thereby generate a ranking of the plurality of workers based on the cross-referencing where the ranking stored on the computer-readable memory, and automatically sending, in response to the ranking, a notification of an assistance request by the robot to a notification terminal of a first ranked worker from among the plurality of workers in the ranking.

BRIEF DESCRIPTION OF THE DRAWINGS

In the accompanying drawings, which illustrate one or more example embodiments.

DETAILED DESCRIPTION

Figure 1:
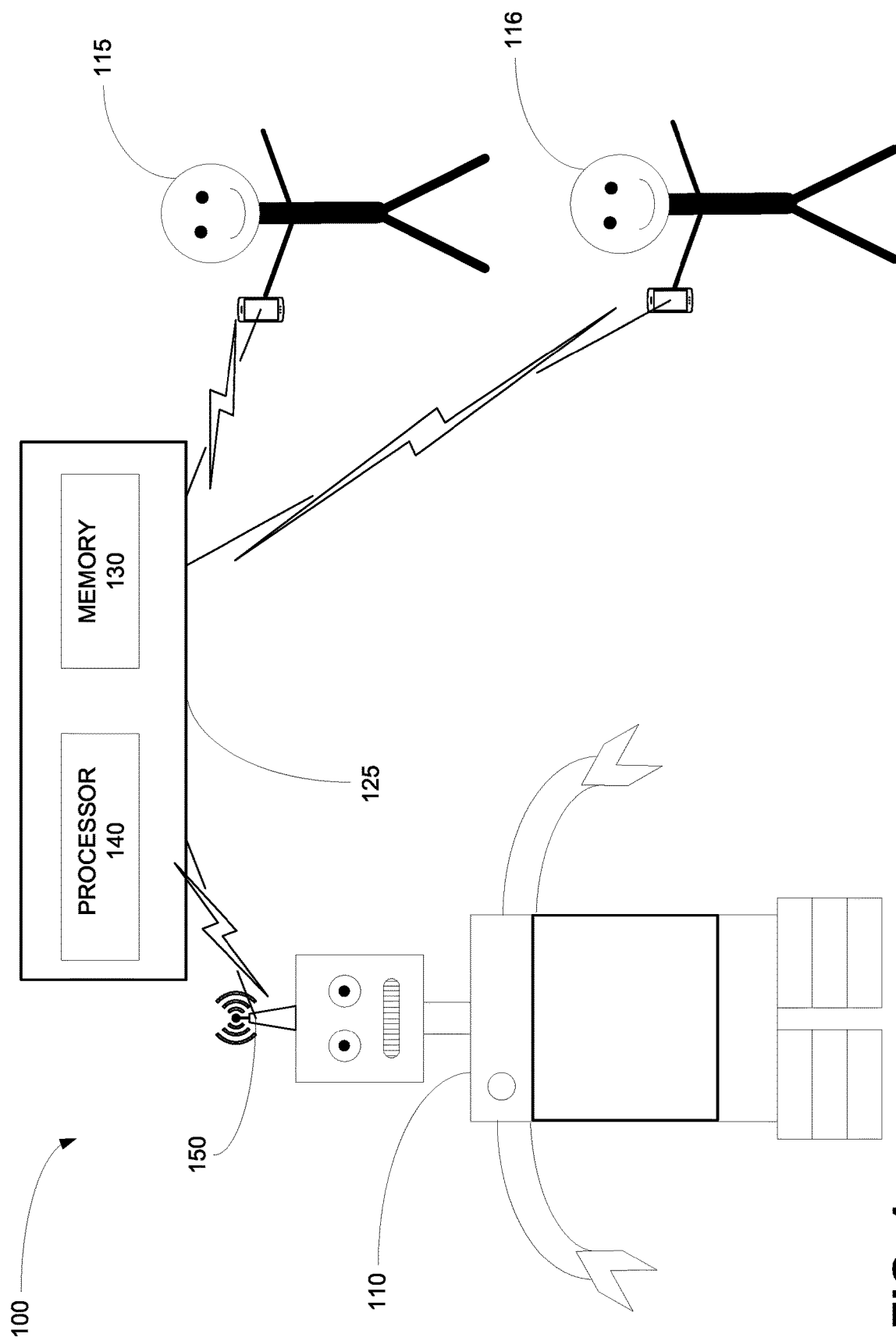
FIG. 1 is a block diagram of a dispatch system for selecting a worker for assisting a robot, according to one embodiment.

Directional terms such as "top", "bottom", "upper", "lower", "left", "right", and "vertical" are used in the following description for the purpose of providing relative reference only, and are not intended to suggest any limitations on how any article is to be positioned during use, or to be mounted in an assembly or relative to an environment. Additionally, the term "couple" and variants of it such as "coupled", "couples", "coupling", and "couplable" as used in this description are intended to include indirect and direct connections unless otherwise indicated. For example, if a first device is coupled to a second device, that coupling may be through a direct connection or through an indirect connection via other devices and connections. Similarly, if the first device is communicatively coupled to the second device, communication may be through a direct connection or through an indirect connection via other devices and connections. The term "couplable", as used in the present disclosure, means that a first device is capable of being coupled to the second device. A first device that is communicatively couplable to a second device has the ability to communicatively couple with the second device but may not always be communicatively coupled.

The term application, as used in this document, refers to a set of instructions executable by a computer processor. The application may be a standalone application or it may be integrated within other applications and systems, such as a computer operating system. A computer, in the context of this document, refers to a device having a processor and a computer readable memory. The memory may be the processor's internal memory. The memory may comprise a separately embodied memory to which the processor has access—e.g. by suitable physical interface, suitable network interface and/or the like.

Robots are finding increased use in the workforce. Previously, robots were primarily used in jobs that did not require mobility, such as in manufacturing. Advances in hardware and software have resulted in mobile robots making inroads in a number of fields, including but not limited to, transportation, deliveries, entertainment, mapping, and cleaning.

Robots are being increasing used in larger and more industrial operations. Robots may be used in large numbers, and in physically expansive areas. The number of robots in use, and the expansive areas that they are used in, presents unique challenges to effectively managing the robots. In particular, the challenge of dispatching human assistance to robots may become impractically complex and cumbersome beyond a certain number of robots operating in a certain area.

Many of these robots may operate autonomously for hours at a time, without human intervention. However, these robots may eventually need assistance from human workers. Assistance may be required for a variety of reasons, including, for example, routine maintenance, resupplying, correction of malfunctions and/or the like. Malfunctions may include hardware or software problems. A team of workers may be used to attend to the robots. Different workers may have different skill sets. For example, one worker may have experience with resolving software issues while another worker may have experience or be skilled in resolving problems with power supplies or sensors. The present disclosure provides a system for selecting a worker from among a group of workers for assisting a robot. It may be advantageous to select a worker based on the type of assistance the robot requests. If more than one worker has the skill set to assist the robot, the systems and methods of the present disclosure provide for ranking the workers based on criteria, such as the level of skill, the location of the worker relative to the robot and/or the like. A list of criteria (assistance criteria) for the robot may be cross-referenced or matched with lists of criteria (worker criteria) for each available worker to determine a ranking for each worker. An assistance request may then be sent to the top ranked worker. If the worker does not accept the request, a request may then be sent to the next ranked worker.

The location of the robot may change with time. Similarly, the location of workers may also change. Using the relative locations of the robot and the workers as a ranking criterion may be advantageous in selecting workers that may reach the robot the quickest, thus potentially decreasing downtime of the robot.

Some criteria may be considered as having a higher priority than other criteria. A weighting for each criterion may be used with the ranking system to account for the relative importance of various criterion when formulating the ranking.

Selecting workers for assistance requests based on their skill set or criterion such as location, provides for an efficient robot dispatch system for assisting robots. Workers are utilized in situations that they are best suited for. Downtime may be reduced, resulting in increased work time for the robot. Additionally, the number of assistance calls the human workers may attend to may be increased. Increasing the efficiency of human workers in a robot assistance and maintenance system may provide even greater advantages for larger operations involving numerous robots and workers.

A robot, for the purposes of the present disclosure, is a mobile machine that can operate autonomously without the presence of an operator. More specifically, robots within the present disclosure are mobile robots that can move and navigate in and around a job-site autonomously without the presence of an operator. For example, a robot may comprise proximity sensors for detecting objects around the robot and software for analysing the data from the proximity sensors and causing the robot to move in a path around the detected objects. The robot may also be provided with a predetermined or configurable path to travel along. The robot may have a program to allowing it to perform pre-determined or configurable actions without an operator. In some embodiments, the robot may be programmed to learn additional actions.

In some embodiments, the robot may always operate autonomously. Additionally or alternatively, the robot may have autonomous (or robot) modes and manual modes. For example, an operator may manually operate the machine when manual operation is desired. The machine may have an input device to activate an autonomous mode. Activating the autonomous mode causes the machine to operate autonomously as a robot. In certain embodiments, the autonomous mode may be activated based on certain conditions being met. For example, the machine may begin running in autonomous mode at a given time.

In the context of the present disclosure, machines described as robots are mobile. The robot may have any suitable mechanism for providing the robot with desired mobility. For example, suitable mobility mechanisms may comprise wheels, tracks, legs, wings, rotary devices, propulsion systems for flight, or any other suitable system. The mobility mechanism may be coupled to a chassis of the robot. A power source for powering the mobility mechanism may also be coupled to the chassis. In some embodiments, multiple power sources may be coupled to the robot. In addition to powering the robot's movement, the power source may also be used for powering other systems of the robot and other functions performed by the robot.

The robot may have one or more actuators for providing movement to the mobility mechanism and thereby moving the robot. Additional actuators may be used for providing movement to other systems of the robot, such as a scrubbing system for rotating scrubbing pads or grippers for gripping items. The actuators may be controlled using any suitable control system. Such a control system may comprise a processor, memory storage systems, and operating software. The robot may also include a communications interface, such as, for example, a wireless transmitter/receiver.

The systems and methods set out in the present disclosure may be used with any suitable type of robot. Some examples of the types of robots that the systems and methods described herein may be used with include, but are not limited to, entertainment robots, delivery robots, portering robots, security robots, warehouse logistics robots, rescue robots, mapping robots, transportation robots, service robots, and janitorial services robots. Janitorial services robots include cleaning robots such as autoscrubbers for scrubbing floors.

Portering robots provide porter services, such as moving an item from one location to another location. For example, a portering robot in a hospital may move surgical supplies to a surgery room.

Referring to FIG. 1, a system 100 for dispatching assistance to a robot 110 is shown. The system 100 may be used for selecting a worker 115,116 from among a plurality of workers for assisting the robot 110. The system 100 includes an application server 125 comprising a computer. The computer has a processor 140 and a computer readable memory 130. The processor 140 may execute a triggering application for identifying triggering data corresponding to a triggering item within sensor data from a robot. A database stored on the computer readable memory 130 may comprise lists of worker criteria items for the workers 115, 116 (e.g. one worker criteria list for each worker) and a list of assistance criteria items for the robot 110. The assistance criteria items may be based on sensor data from the robot. In response to an identification of triggering data corresponding to the triggering item by the triggering application, the processor 140 may execute a ranking application for cross-referencing, for each of the plurality of workers 115, 116, the worker's corresponding list of worker criteria items with the list of assistance criteria items and ranking the plurality of workers 115, 116 based on the cross-referencing. The processor 140 may also execute an application for selecting one of the workers 115, 116 based on the ranking. A notification application may be executed for notifying the selected worker of an assistance call using a communications interface 150.

In some embodiments, the ranking application may comprise performing a computer-implemented optimization. The optimization may take, as inputs: a worker set (or matrix) W for a group of m workers, the matrix W being made up of a set of worker lists (or vectors) $w_i$ (i=1 . . . m) with one worker vector $w_i$ for each worker and i representing an index identifying a corresponding one of the plurality of m workers; and a set (or matrix) R for a group of n robots, the matrix R being made up of a set of robot lists (or vectors) $r_j$ (j=1 . . . n) with one robot vector $r_j$ for each robot and j representing an index identifying a corresponding one of the plurality of n robots. Each element of worker vector $w_i$ may comprise a worker criteria item. Non-limiting examples of worker criteria items include {location, experience_level, job_queue, unavailable, nav_exp, clean_exp, general_exp}. Each element of robot vector $r_j$ may comprise an assistance criteria item. Non-limiting examples of assistance criteria items include {location, navigation error, cleaning error, miscellaneous error}. The above-described exemplary worker and assistance criteria items, are used to describe the computer-implemented optimization that may be performed by the ranking application, it being understood that these criteria items are non-limiting examples used for the purpose of illustration.

A cost $y_{ij}$ for each worker i to assist each robot j may ascertained as part of the optimization. The cost function may be based on a distance between the worker and the robot, and an ability of the worker to perform a given task. An example cost may be computed according to:

$$y_{i,j} = W_d \frac{1}{(d(w_i) - d(r_j))^2} + \quad (1)$$
$$W_{f1}(f_1(w_i, r_j)) + W_{f2}(f_2(w_i, r_j)) + \ldots + W_{fk}(f_k(w_i, r_j))$$

where d( ) represents the location of the worker or robot, and $f_1( ), f_2( ), \ldots, f_k( )$ are match evaluation functions which evaluate (i.e. output a metric which assesses how well) a worker criteria (i.e. an element of the worker vector $w_i$) matches with a robot assistance criteria (i.e. an element of the robot vector $r_j$). For example, assuming the robot has a navigation error, one such match evaluation function $f_k$ could be as follows:

$$f_k(w_i, r_j) = \begin{cases} \text{if } r_j(\text{nav\_error}) = 1 \text{ and } w_i(\text{nav\_exp}) = 1 \text{ then } 1 \\ \text{otherwise} \quad\quad\quad\quad 0 \end{cases} \quad (2)$$

While the example match evaluation function of equation (2) outputs a boolean metric, this is not necessary. In general, the match evaluation functions $f_1( ), f_2( ), \ldots, f_k( )$ could output any scalar. In some embodiments, it is convenient for match evaluation functions $f_1( ), f_2( ), \ldots, f_k( )$ to output a number in a range [0,1].

$W_d$ may represent a weight of the relative importance of the distance between a worker and the robot, and $W_{f1}, W_{f2}, \ldots, W_{fk}$, may represent relative weights of an importance of each of the match evaluations $f_1( ), f_2( ), \ldots, f_k( )$. The weights $W_{f1}, W_{f2}, \ldots, W_{fk}$ may be set dynamically depending on particular applications (e.g. the job site or other circumstances which may dictate the relative importance of one match evaluation function over another and/or the like).

With the cost $y_{ij}$ known for each robot and worker pair, the objective in selecting the optimal distribution of workers may be to maximize the cost for all possible robot and worker pairs. In one embodiment, the costs $y_{ij}$ may be represented in a cost matrix:

$$Y = \begin{bmatrix} y_{0,0} & y_{0,1} & \cdots & y_{0,j} & \cdots & y_{0,m-1} & y_{0,m} \\ y_{1,0} & y_{1,1} & \cdots & y_{1,j} & \cdots & y_{1,m-1} & y_{1,m} \\ \vdots & \vdots & \ddots & \vdots & \ddots & \vdots & \vdots \\ y_{i,0} & y_{i,1} & \cdots & y_{i,j} & \cdots & y_{i,m-1} & y_{i,m} \\ \vdots & \vdots & \ddots & \vdots & \ddots & \vdots & \vdots \\ y_{n-1,0} & y_{n-1,1} & \cdots & y_{n-1,j} & \cdots & y_{n-1,m-1} & n-1 \\ y_{n,0} & y_{n,1} & \cdots & y_{n,j} & \cdots & y_{n,m-1} & y_{n,m} \end{bmatrix} \quad (3)$$

The optimization problem can then be phrased as a linear programming problem, and represented with the objective function:

$$\text{maximize} \sum_{i=0}^{n-1} \sum_{j=-}^{m-1} Y(i, j) X(i, j) \quad (4)$$

$$\text{subject to} \sum_{i=0}^{n-1} X(i, j) = 1 \text{ for each } j = 0, 1, \ldots, m-1 \quad (5)$$

$$\sum_{j=0}^{m-1} X(i, j) = 1 \text{ for each } i = 0, 1, \ldots, n-1 \quad (6)$$

where X(i,j) is a binary matrix whose values are selected from only {0, 1}. The nature of the binary matrix X(i,j) and the constraints expressed in equations (5) and (6) ensure that only one robot may be assigned to one worker and that only one worker may be assigned to each robot.

In some embodiments, a variation of the so-called Hungarian Method for the maximization of the unbalanced assignment problems may be used to solve the optimization problem (e.g. the optimization problem expressed in equations (4)-(6)). For the optimization problem expressed in equations (4)-(6), the problem may first be converted into a minimization problem by subtracting the largest probability max[Y] in the cost matrix Y from the rest of the cost matrix:

$$Y^* = \max[Y] - \begin{bmatrix} y_{0,0} & y_{0,1} & \cdots & y_{0,j} & \cdots & y_{0,m-1} & y_{0,m} \\ y_{1,0} & y_{1,1} & \cdots & y_{1,j} & \cdots & y_{1,m-1} & y_{1,m} \\ \vdots & \vdots & \ddots & \vdots & \ddots & \vdots & \vdots \\ y_{i,0} & y_{i,1} & \cdots & y_{i,j} & \cdots & y_{i,m-1} & y_{i,m} \\ \vdots & \vdots & \ddots & \vdots & \ddots & \vdots & \vdots \\ y_{n-1,0} & y_{n-1,1} & \cdots & y_{n-1,j} & \cdots & y_{n-1,m-1} & n-1 \\ y_{n,0} & y_{n,1} & \cdots & y_{n,j} & \cdots & y_{n,m-1} & y_{n,m} \end{bmatrix} \quad (7)$$

Next, the problem may be converted into a balanced problem by adding dummy variables. Assuming that there are more robots than workers (m>n) then the balanced cost matrix becomes:

$$Y^{**} = \begin{bmatrix} Y^* \\ 0 \end{bmatrix} \quad (8)$$

Where O is a matrix of (m-n)×m zeros. Given the new cost matrix Y, the Hungarian optimization method (or any other suitable linear programming or optimization methodology) may be applied to the method for minimization may be applied to the new cost matrix Y subject to the constraints of equations (5) and (6).

The output of the optimization will be an optimal set of assignments of workers to robots requesting assistance—e.g. a set of assignments of selected workers to selected robots that maximizes the equation (4) cost function subject to the constraints of equations (5) and (6). The assumption of the example above assumes that there are more robots than workers (m>n). In such a case, the optimal set of assignments may comprise n selected worker-robot pairs. In the case where there are more workers than robots (m<n), the optimal set of assignments may comprise m selected worker-robot pairs. Selected workers may be notified of their assignments and may accept their assignments via a suitable notification application, as described elsewhere herein.

Figure 6:
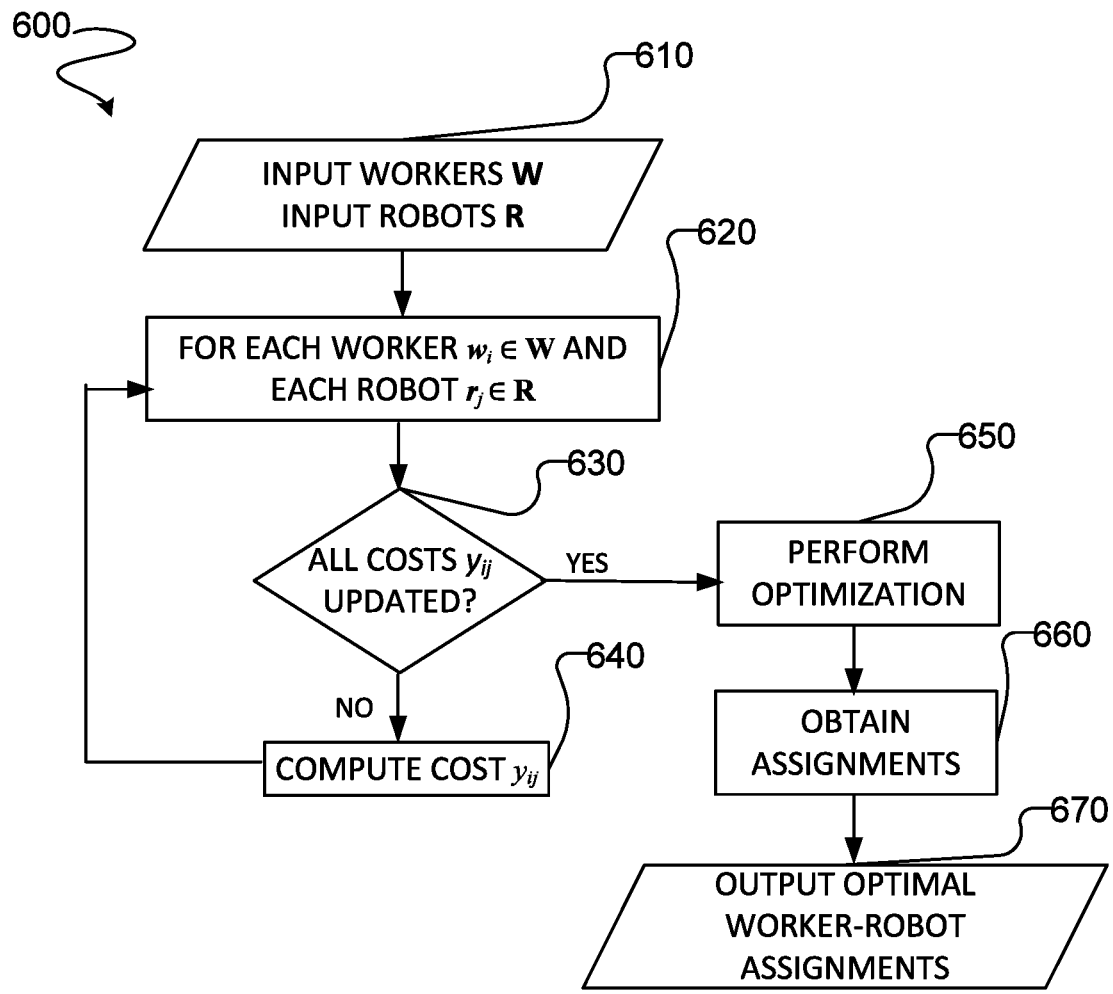
FIG. 6 is a flow chart of a method for assigning workers to robots which involves a computer-implemented optimization which may be performed by a ranking application according to a particular embodiment.

FIG. 6 is a flowchart showing a method 600 according to the optimization procedure described above, which may be implemented by the ranking application in some embodiments. Method 600 starts (block 610) with the matrices W and R which respectively include the set of worker lists (or vectors) $w_i$ (i=1 . . . m) with one worker vector $w_i$ for each worker and the set of robot lists (or vectors) $r_j$ (j=1 . . . n) with one robot vector $r_j$ for each robot. In the loop of blocks 620, 630 and 640, the costs $y_{ij}$ for each worker i to assist each robot j are ascertained to obtain a cost matrix Y of the type described in equation (3) above.

Equation (1) represents one example of a suitable cost function which may be used to compute the costs of block 640. At the conclusion of the loop of blocks 620, 630, 640, a linear programming optimization may be performed in block 650. One example of a suitable optimization problem is described in equations (4), (5) and (6) above. The output of the block 650 optimization is a binary matrix with at most one non-zero entry in each column and row. The single non-zero entry for each row-column pair may be unity. In block 660, the non-zero entries in the block 650 optimization output matrix may be used to generate assignments of workers to robots or vice versa (output 670). By way of example, the block 650 output matrix can look like the following.

|  | 1$^{st}$ robot | 2$^{nd}$ robot | 3$^{rd}$ robot | 4$^{th}$ robot | 5$^{th}$ robot |
| --- | --- | --- | --- | --- | --- |
| 1$^{st}$ worker | 0 | 0 | 0 | 1 | 0 |
| 2$^{nd}$ worker | 0 | 0 | 0 | 0 | 1 |
| 3$^{rd}$ worker | 1 | 0 | 0 | 0 | 0 |
| 4$^{th}$ worker | 0 | 0 | 1 | 0 | 0 |
| 5$^{th}$ worker | 0 | 1 | 0 | 0 | 0 |
| 6$^{th}$ worker | 0 | 0 | 0 | 0 | 0 |

The optimization algorithm assigns the 1's within the block 650 binary output matrix to maximize the cost, which in turn, simultaneously selects the globally optimal worker-robot pairs and assigns these pairs unity values in the block 650 output matrix. In block 660, the block 650 optimization output is used to generate optimal assignments of selected worker-robot pairs (output 670) by searching for the unity values within the block 650 binary output matrix. The unity entries within the block 650 binary output matrix correspond to robot worker pairs (output 670).

Referring again to the embodiment of the system shown in FIG. 1, an application server 125 located remotely (for the present disclosure, located remotely means not having a wired connection for communications purposes) relative to the robot 110 may be used as part of the system for selecting workers 115,116 for assisting a robot 110. The application server 125 may comprise a computer and the computer may comprise one or more processors 140 or microprocessors, such as a central processing unit (CPU). The processor 140 performs arithmetic calculations and control functions to execute software stored in a computer readable memory 130. The computer readable memory 130 may be an internal memory, such as one or both of random access memory (RAM) and read only memory (ROM), and possibly additional memory. The additional memory may comprise, for example, mass memory storage, hard disk drives, optical disk drives (including CD and DVD drives), magnetic disk drives, magnetic tape drives (including LTO, DLT, DAT and DCC), flash drives, program cartridges and cartridge interfaces such as those found in video game devices, removable memory chips such as EPROM or PROM, emerging storage media, such as holographic storage, or similar storage media as known in the art. This additional memory may be physically internal to the computer, or external as shown or both. The processor 140 may retrieve items, such as applications and data lists, stored on the additional memory and move them to the internal memory, such as RAM, so that they may be executed or to perform operations on them.

The application server 125 may also comprise other similar interfaces for allowing computer programs or other instructions to be loaded. Such interfaces may comprise, for example, a communications interface 150 or transmitter that allows software and data to be transferred between the application server 125 and external systems and networks, such as the robot 110. Examples of the communications interface comprise a modem, a network interface such as an Ethernet card, a wireless communication interface, or a serial or parallel communications port. Software and data transferred via the communications interface are in the form of signals which may be electronic, acoustic, electromagnetic, optical, or other signals capable of being received by the communications interface. Multiple interfaces, of course, may be provided on the application server 125.

In some embodiments, the application server may also comprise a display, a keyboard, pointing devices such as a mouse, and a graphical processing unit (GPU). The various components of the application server are coupled to one another either directly or indirectly by shared coupling to one or more suitable buses.

Figure 2:
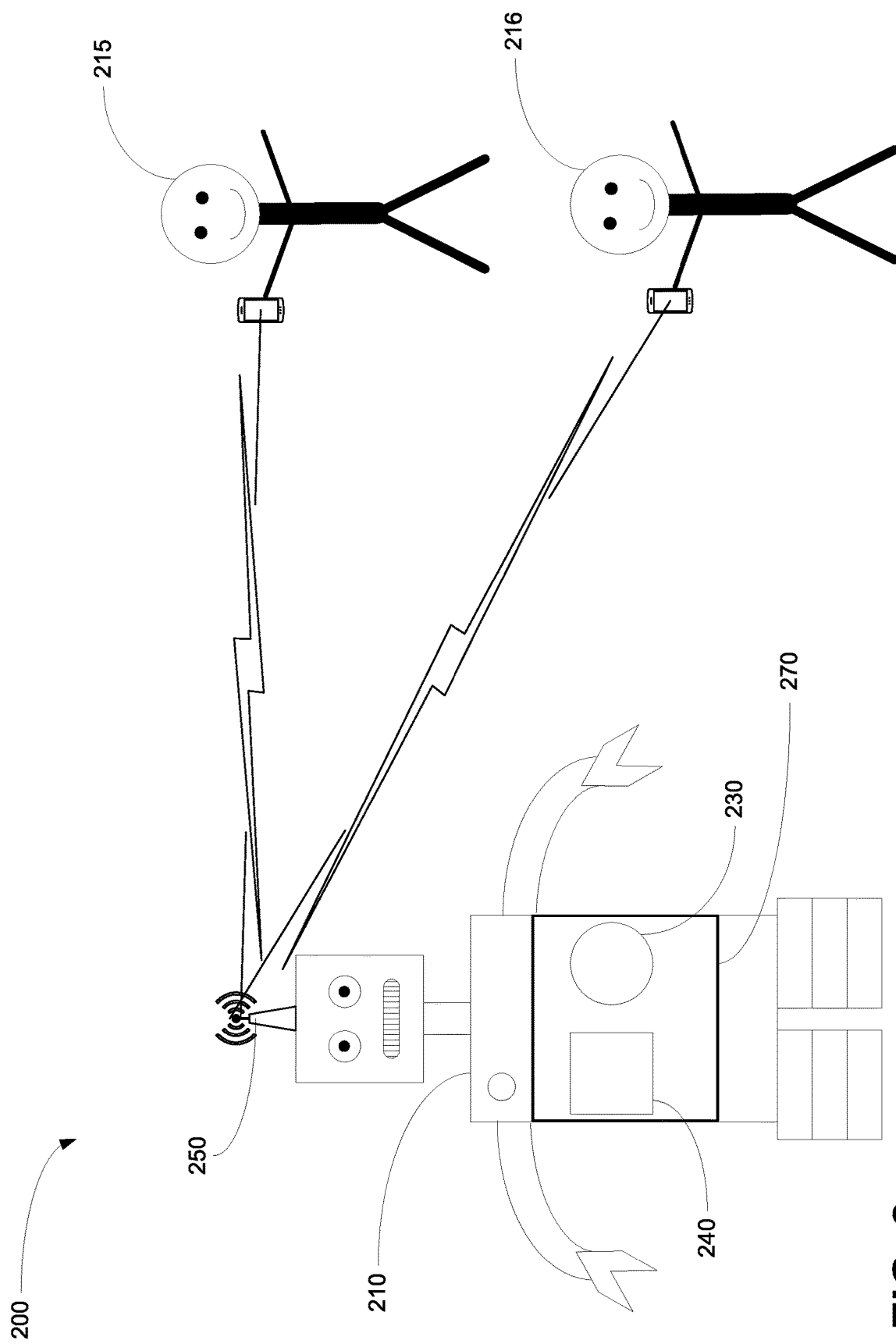
FIG. 2 is a block diagram of a dispatch system wherein a robot selects and notifies a worker of an assistance request according to a particular embodiment.

In some embodiments, the computer may be coupled to either a robot or a device carried by or worn by a worker. For example, referring to FIG. 2, the computer 270, comprising a processor 240 and a computer readable memory 230, is coupled to the robot 210. When the dispatch system 200 is triggered by the addition of a triggering item to a list of assistance criteria for the robot 210, the ranking application wirelessly communicates with each worker 215, 216 using a communications interface 250 coupled to the robot 210 and receives a list of worker criteria items from each worker 215,216. The ranking application may cross-reference each list of worker criteria with the list of assistance criteria, matching corresponding items, and rank one of the worker 215, 216 as the top ranked worker. The ranking application may then use the communications interface 250 to send a notification of an assistance call by the robot to the top ranked worker. In certain embodiments, the ranking application may generate a ranked list of workers. The ranking application may also select a worker, such as a top ranked worker, from the ranked list of workers.

Referring again to FIG. 1, the processor 140 may also execute a triggering application. The triggering application may be executable by the processor for identifying triggering data corresponding to a triggering item within sensor data from a robot. In some embodiments, the triggering application may comprise a matching routine for matching the sensor data to a triggering data set from a triggering list. The triggering item may correspond to the triggering data set. The triggering list may be stored on the computer readable memory 130 and may include one or more triggering data sets, each of which may correspond to a triggering item. A triggering data set may comprise data related to a reason due to which the robot may benefit from human assistance. It may be data related to, for example, a malfunction in a system of the robot, low supplies of consumables, maintenance issues, or any suitable reason for requiring assistance. The data in a triggering data set may correspond to data provided by a sensor coupled to the robot that shows an issue with the robot that may need to be resolved by a human worker. A triggering data set may include any suitable number of data items needed for identifying an issue with the robot that may need human intervention. The data set may comprise data directly corresponding to data generated by a sensor or data based on data generated by a sensor. For example, raw data from the sensor may be processed for use by an application. In some embodiments, the sensor may be implemented by a processor coupled to the robot, such as the robot's CPU.

A ranking application for ranking workers may be executed in response to an identification of triggering data corresponding to the triggering item within the sensor data by the triggering application. Sensor data may comprise data generated by one or more sensors coupled to the robot. The one or more sensors may include one or more processors coupled to the robot. The sensor data may be raw data produced by the sensors or data that has undergone one or more processing steps. The triggering application may compare the sensor data with triggering data contained in the triggering data sets on the triggering list. A match may result in the ranking application being launched.

In some embodiments, triggering data sets may correspond to assistance criteria items. These assistance criteria items may be considered triggering items. In certain embodiments, the triggering data sets themselves may be represented by the corresponding triggering items. The assistance criteria items may be based on sensor data. Sensor data that indicates an issue with the robot that may need human intervention may be represented as an assistance criteria item.

Figure 3:
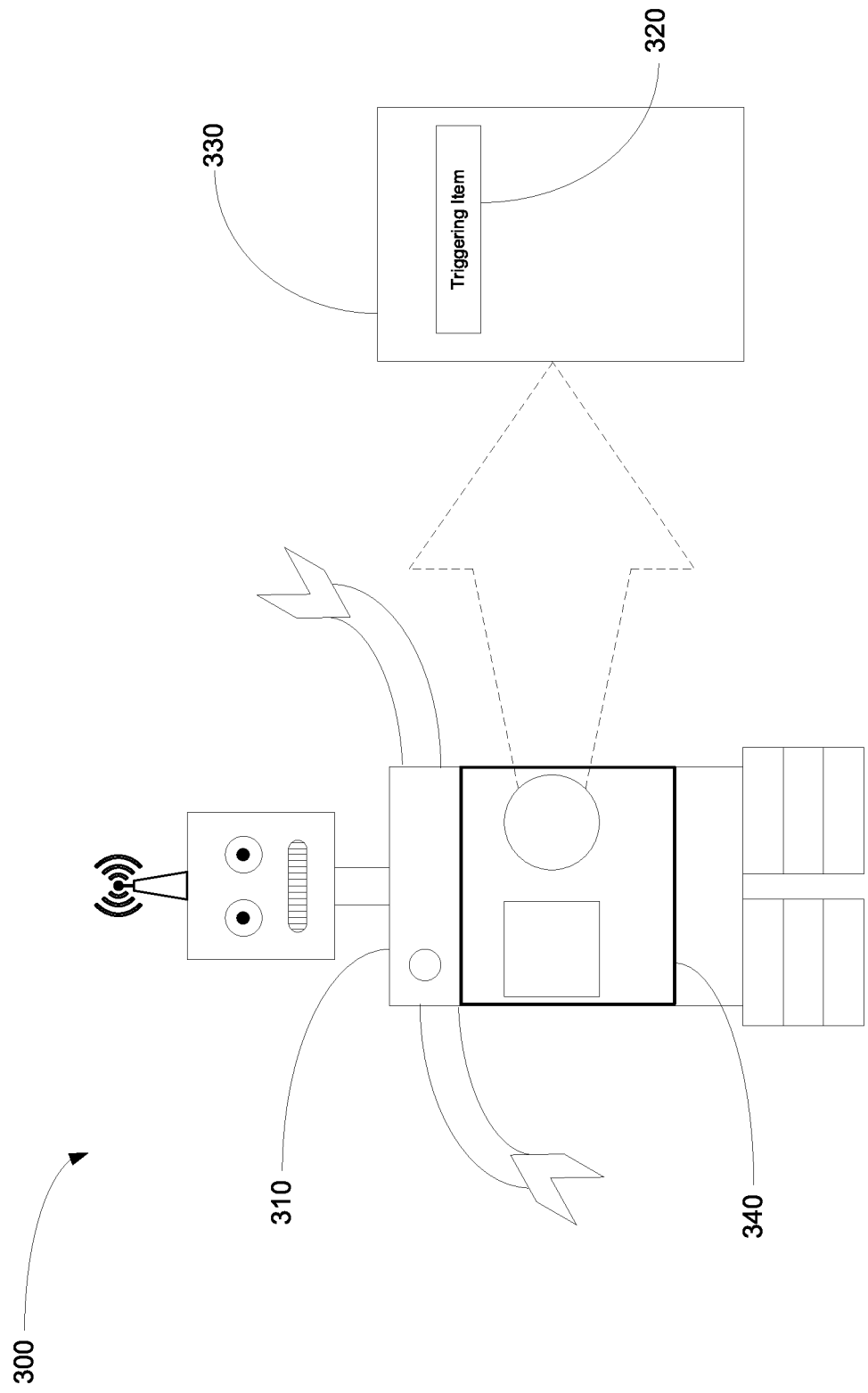
FIG. 3 is a block diagram of a system for triggering a dispatch system according to a particular embodiment.

Referring to FIG. 3, a triggering system 300 for triggering the dispatch system is shown. The dispatch system may be triggered when an item 320 is added to a list of assistance criteria items 330 for a robot 310. The addition of the item 320 to the list 330 may cause a ranking application to be launched and executed by the computer 340. In some embodiments, an application may monitor a list 330 of assistance criteria items to see if an item 320 has been added to it and may launch the ranking application when the application monitoring the list 330 reads the item 320 on the list 330. A ranking application itself may monitor one or more lists of assistance criteria items by periodically scanning each list. In certain embodiments, a list of assistance criteria items may be integrated with a ranking application such that the addition of an item to the list acts as an executable command for the ranking application to begin the ranking process.

A list of assistance criteria and/or a list of worker criteria may at times contain no items. An item may be added to a list for inclusion on that list. For example, a list of assistance criteria items may be an empty list until a sensor detects a problem with the robot. An assistance criteria item may then be added to the list of assistance criteria items for inclusion on that list. In certain embodiments, a list of assistance criteria items and/or a list of worker criteria items may be created when a first item is detected or created. For example, a list of assistance criteria items may be created when a sensor detects a problem with the robot, with the detected problem becoming an assistance criteria item on the list.

In some embodiments, assistance criteria items may be based on sensor data from the robot. Sensor data that corresponds to an issue that a human worker needs to address may be represented as an assistance criteria item. For example, a flowmeter may be coupled to a cleaning robot for detecting the rate of flow of water through a nozzle. There may be a range of flowrate values that may be considered as a normal operating range for the nozzle. Flowrates outside of this range may be associated with a malfunctioning water spraying system. Data representing flowrates outside of the normal operating range may be represented as one or more assistance criteria items. When a sensor generates data associated with a malfunctioning system, an assistance criteria item representing that data may be added to a list of assistance criteria items. In some embodiments, the assistance criteria item may comprise the data from the sensor. In certain embodiments, the assistance criteria item may comprise data based on the data from the sensor. In some cases, the assistance criteria item may comprise a data value that corresponds to the sensor data.

For example, the assistance criteria item may be the name of a system of the robot, such as a water spraying system. The name of the system may correspond to sensor data associated with a system requiring human assistance.

In some embodiments, the inclusion of specific items to a list of assistance criteria items may trigger the launch of a ranking application. The list of assistance criteria may contain items that do not result in the launching of the ranking application and an assistance request. For example, the location of a robot may be included on the list of assistance criteria without triggering the dispatch system. In certain embodiments, lists of assistance criteria items may be forwarded to workers without an assistance request being made. The list may comprise items for maintenance or repair that are not urgent. The robot may still perform its intended function without servicing from a human worker. For example, a janitorial services robot that scrubs floors and vacuums may have a trash compartment that is full and a malfunction with vacuum system. These items may be added to the list of assistance criteria items without triggering an assistance request if the robot is engaged in scrubbing a floor and is not using its vacuuming function. The list may be shared with workers, allowing workers to attend to the robot at their convenience. If the robot experiences, for example, a malfunction with its drive system, the addition of the drive system to the list may trigger the ranking application to execute and an assistance request to be made. Specific items that may trigger the ranking application may be pre-set or user-configured as triggering items well as rules for conditions that may cause specific items to become triggering items. For example, a malfunction with a vacuum system of a multi-functional janitorial services robot may act as a triggering system if the vacuuming system is in use. If the robot is performing other functions and the vacuuming system is not in use, the vacuum system may be added as an item to the list of assistance criteria items without triggering the ranking application to execute.

In some embodiments, a location of the robot may be treated as a non-triggering item and may be added to a list of assistance criteria items without triggering the dispatch system. In certain embodiments, a location of the robot may be added to the list of assistance criteria items whenever a triggering item is added to the list.

In certain embodiments, any item added to the list of assistance criteria items may be considered a triggering item and may trigger the dispatch system by causing the ranking application to execute. Items that may be considered as non-triggering items, such as a location of the robot or a relative distance to the robot, may be added to the list following the launch of the ranking application.

In some embodiments, a communication of an item to be added to a list of assistance criteria items may act as a trigger for launching the dispatch system. For example, a list of assistance criteria items may be maintained on a computer readable memory at a remote server. A monitoring application may detect a malfunction in a robot and wirelessly communicate the malfunction as an item to be added to the list of assistance criteria items stored at the remote server. The communication from the monitoring system may trigger the launch of the dispatch system. Other items, such as a location of the robot, may then be added to the list of assistance criteria items. In certain embodiments, a periodically updated location of the robot may be maintained on the list of assistance criteria items, regardless of whether other items are on the list or not.

Alternatively and additionally, any suitable triggering system may be used to trigger the dispatch system.

Referring again to FIG. 1, the computer readable memory 130 may include lists of worker criteria items for the workers 115, 116. The lists of worker criteria items may be stored as, for example, a list or multiple lists. Each worker may have their own list of criteria. The list of worker criteria items may include various attributes related to the worker. Any suitable number of items and any suitable types of items may be used. In some embodiments, the worker criteria items may include, without limitation, items related to the worker's skills. For example, the worker may be skilled in repairing malfunctioning wheels. The list of worker criteria items may then list this skill. In certain embodiments, the skill may be rated based on the level of the skill. For example, one worker may possess expert level skills while another worker may possess entry level or novice skills. Any suitable rating method may be used. For example, in some embodiments, a numbered, lettered, or descriptive rating may be used.

In certain embodiments, the list of worker criteria items for each worker may include, without limitation, tools and supplies available to the worker. For example, one worker may have diagnostic tools for diagnosing a sensor attached to the robot. Another worker may have tools for replacing a worn nozzle. As supplies and/or tools are used or replaced, the list of worker criteria items for each worker may be updated to reflect the changes. In some embodiments, the updates may be entered at the application server. The worker may, for example, personally enter the changes to the list of worker criteria items for that worker at the application server. In certain embodiments, the worker may communicate the changes to another person at the application server and have this person enter the changes. Additionally or alternatively, the worker may enter the changes at a terminal located remotely from the application server and have the changes communicated wirelessly to the application server. For example, the worker may enter the changes to the list of worker criteria items for that worker at a handheld device, such as a smart phone or tablet. In some cases, the worker may use a laptop, desktop, or any suitable type of computing device to enter the changes. In certain embodiments, the changes may be entered at a terminal coupled to the robot.

In some embodiments, each list of worker criteria may be automatically updated. Sensors may detect the consumption and re-supply of consumables. For example, a fluid gauge may detect the level of fluid in a fluid container at a worker's location. The fluid may be, for example, liquid detergent for use in an autoscrubbing robot. The fluid gauge may communicate the level of fluid in the container to a database that maintains the worker criteria list.

Any suitable type of software may be used for updating the lists of worker criteria items. For example, a worker may use an application for updating the list of worker criteria items for that worker. The application may list pre-existing items and the worker may change the status of an item to indicate whether it is available or not. In some cases the worker may indicate the quantity of each available item. In some embodiments, the worker may also be able to enter in new or customized items or skills.

In certain embodiments, the worker may update the list of worker criteria items by scanning in supplies or tools. For example, the worker may use a scanning device to scan barcodes, electronic chips, or anything coupled to supplies or tools and suitable for scanning, to scan tools or supplies. The list of worker criteria items may be updated based on the scanned items. The scanning device may send information about the scanned items to an application server for updating the list of worker criteria items. Additionally or alternatively, the list of worker criteria items may be stored on the scanning device. The list of worker criteria items may then be updated at the scanning device.

In some embodiments, a location at which the worker is located may have tools or supplies that may be useful for assisting the robot. A list of the tools and supplies available at the location may be stored in the database and added to the list of worker criteria items if the worker happens to be at that location. In some embodiments, the worker may update the list of worker criteria items by indicating that the worker is at the location. The list of tools and supplies may then automatically be appended to the list of worker criteria items. In certain embodiments, a positioning system, such as a local positioning system or a global positioning system may be used to signal the worker's presence at the location. For example beacon or other suitable signalling device coupled to the worker may signal the worker's presence in the location. For example, the worker may have a handheld device or a wearable device that couples communicatively with a reference device at the location to signal the worker's presence when the worker is within a given proximity of the reference device. The list of tools and supplies at the location may then be added to the list of worker criteria items automatically by an updating application. Once the worker leaves, the list of tools and supplies at the location may be removed from the list of worker criteria items.

In some embodiments, the skills, tools, supplies, and other items that may be added to the list of worker criteria items may correspond to systems of a robot that may request assistance from the workers and/or consumable supplies carried by the robot. For example, the robot may be a janitorial service robot with a water spraying system and carrying a cleaning solution. The items that may be added to the list of worker criteria items may include, without limitation, skills and tools corresponding to possible malfunctions with the water spraying system. The list of worker criteria items may also include, without limitation, supplies such as water and cleaning solution. Having items that may be added to the list of worker criteria items correspond to systems and consumables of the robot may allow a comparison of the list of worker criteria items and the list of assistance criteria items of the robot where corresponding items may be matched together.

In some embodiments, the respective list of worker criteria items for each of the workers may comprise, without limitation, a location of the respective worker. The location of each worker may be determined by any suitable locating or tracking system, such as a global positioning system or a local positioning system. In the case of a local positioning system, the local positioning system may comprise, for example, a tracking device carried by a worker that communicates wirelessly with devices at fixed reference points at the job-site that the system is being used at. The tracking device may send signals to the devices at the fixed reference points. In some embodiments, signals may be sent from devices at the fixed reference points to a worker's tracking device. The signals, received either by a device at a fixed reference point or by the worker's tracking device, may be relayed to a locating processor. The locating processor may be at a remote server, such as an application server. In some embodiments, the locating processor may be part of a computing device carried or worn by the worker. In certain embodiments, the locating processor may be located at a robot.

The locating processor may execute a locating application to determine a location of the worker. The location of the worker may be provided as, for example, a set of coordinates. The locating application may use any suitable locating algorithm, including distance determining (ranging) and angulating methods to estimate the worker's location. For example, algorithms and methods such as trilateration, multilateration, triangulation, angle of arrival, line-of-sight, time of arrival, time of flight, or two-way ranging may be used. Distances between the fixed reference points may be determined and stored for use by the locating algorithm. In some embodiments, the distances between the fixed reference points may be determined using signals between the fixed reference points. These distances may be determined in real time when they are used to determine the worker's location or they may be determined initially and stored for use by the locating algorithm when the worker's location is being determined.

The worker may carry any suitable tracking device. In some cases, the tracking device may be part of a handheld device, such as a mobile phone, carried by the worker. In some embodiments, the worker may wear a tracking device. For example, the tracking device may be part of a wearable wrist watch style device. In certain embodiments, the device may be integrated into a card or tag carried or worn by the worker. The tracking device may wirelessly communicate with fixed reference points.

The fixed reference points may comprise any suitable device for communicating with a tracking device worn by a worker. For example, a beacon comprising a transmitter or receiver or both may be located at a fixed reference point. Any suitable wireless communication may be used by the worker's tracking device and the device at the fixed reference point. For example, communications based on radio frequency signals, ultrasound signals, laser signals, or infrared signals may be used.

In some embodiments, a worker's location may be estimated by tracking the worker as the worker moves within a pre-set distance of a device at any of a number of fixed reference points. A tracking device worn by the worker may send a signal to the device at the fixed reference point. Alternatively or additionally, the device at the fixed reference point may send a signal to the tracking device worn by the worker when the worker is within a pre-set distance of the device at the fixed reference point. The signal may then be sent to a locating processor. The worker's location may then be recorded as the position of the fixed reference point the worker was close to. If the worker moves to within a pre-set distance of another fixed reference point, the worker's location may be updated to the new fixed reference point.

In certain embodiments, a relative distance between each worker and a robot may be used as the location for each worker's respective list of worker criteria items. In these embodiments, the relative distance for a particular robot may be added as the location following an assistance request by the particular robot. A device carried by each worker may communicate with a communications interface coupled to the robot. A signal travelling between the worker and the robot may be used by any suitable ranging application to determine a relative distance between the robot and the worker. A system for determining relative distances rather than a location may be useful where a location may be visually detected. The lack of devices at fixed reference points may be economically desirable.

In some embodiments, a relative distance between a robot and a worker may be calculated as a distance of a path through multiple reference points. For example, the robot and the worker may not share a line of sight. Each may, however, share a line of sight path with a common reference point. A relative distance between the worker and the common reference point may be combined with a relative distance between the common reference point and the robot to determine a relative distance between the robot and the worker. In some cases, several reference points may link the path between the robot and the worker. A coordinate location and a relative distance may then be provided.

In certain embodiments, a relative distance between a robot and a worker may be determined by determining a location of the worker, as discussed above, and using a similar locating system to determine a location of the robot. A distance between the robot and the worker may then be determined using the locations of each. In some embodiments, a travelling distance between the robot and the worker may be longer than a straight line distance between the robot and the worker. In these embodiments, the relative distance may be the travelling distance and may be calculated using any suitable location and distance determining application. For example, locations of the robot and the worker may be input to a mapping application that contains a map of the city, the facility, the job site and/or the like where the robot and worker are located. The map may include distances and sizes. The mapping application may use the included distances to determine the length of path between the robot's location and the worker's location.

The location of each worker may be tracked in real time and added to the list of worker criteria items when an assistance request is made. The location may be added as a set of coordinates. In some embodiments, a relative distance may be added to the list of worker criteria items without the actual location. In embodiments where a relative distance is added as the location to the list of worker criteria items and not an actual location, a null value may be added to the list of assistance criteria items of a robot for matching with the lists of worker criteria items. In some cases, a location may not be added to the list of assistance criteria items. The relative distances on each list of worker criteria items may be compared and the list of worker criteria items with the shortest relative distance may be given a match by the ranking application.

In some embodiments, a location of each worker may be determined when an assistance request is made. Alternatively and additionally, a location of each worker may be determined at any suitable time.

Referring again to FIG. 1, the database stored on the computer readable memory 130 may also comprise a list of assistance criteria items for the robot 110. A list of assistance criteria items may comprise a list or lists of any suitable items that will provide information to a worker for assisting the robot. For example, an item in the list of assistance criteria items may be a location of the robot. The assistance criteria items may also include, without limitation, consumables that need to be replenished. The consumables may be supplies used by the robot in its work. Any suitable application may be used to add items to the list of assistance criteria items. In some embodiments, an application stored at the robot and executed by a processor at the robot may add items to the list of assistance criteria items. In certain embodiments, an item may be communicated to the application server by the robot and an application at the application server may add the item to the list of assistance criteria items.

In the case of a janitorial services robot, such as an autoscrubber for example, the list of assistance criteria items may comprise, for example, water or cleaning fluid as needing to be resupplied. The robot's internal systems, such as the robot's processor or sensors coupled to the robot, may track the level of water or cleaning fluid. Any suitable sensor may be used for tracking the level of water or cleaning fluid. For example, the robot may use floats, load cells, magnetic level gauges, hydrostatic devices such as displacers, bubblers, and differential-pressure transmitters, capacitance transmitters, magnetostrictive level transmitters and time-of-flight systesm, such as ultrasonic or laser based systems. In certain embodiments, the robot may employ scales to determine changes in mass to determine a fluid level or track the amount of fluid being dispensed using a flowmeter and timer, for example, to calculate the fluid level. Once the fluid level of the water or cleaning fluid falls below configurable level, the name of the fluid with the low level may be added to the list of assistance criteria items. The name of the fluid may be added by an application executed by the robot or, in some embodiments, the name may be communicated by the robot to an application server. An application at the application server may add the name of the fluid that has a flow fluid level.

Continuing with the example of an autoscrubber, a scrubbing pad on the autoscrubber may be added to the assistance criteria items as well. In some embodiments, a user may have a schedule for replacing scrubbing pads. The scrubbing pad may then be added to the list of assistance criteria items of the robot based on the schedule. For example, if the schedule calls for the scrubbing pad to be replaced weekly, the scrubbing pad may be automatically added to the list of assistance criteria items weekly. In certain embodiments, the cleaning pad may be added to the list of assistance criteria items after the robot has scrubbed a set size of area.

The list of assistance criteria items for a robot may be updated to reflect the replacement or consumption of items. Any suitable method or system for updating the list of assistance criteria items may be used, including manually updating the list of assistance criteria items and automatically updating the list of assistance criteria items. For example, once a worn scrubbing pad has been replaced on an autoscrubber, the list of assistance criteria items may be updated to remove the worn scrubbing pad from the list of assistance criteria items.

Any suitable method for updating the list of assistance criteria items may be used. In some embodiments, the worker may update the list. For example, the worker may update the list of assistance criteria items using a handheld device communicatively coupled to the robot or to an application server. In some cases, the worker may update the list of assistance criteria items using an input terminal coupled to the robot.

In certain embodiments, the list of assistance criteria may be updated automatically. For example, the robot may be coupled to sensors that detect that a scrubbing pad has been changed. For example, an optical sensor may detect when a scrubbing pad is removed and added. The removal of a pad followed by the addition of a pad may signal a pad replacement. In some cases, a switch may be triggered when a pad is removed. For example, a spring loaded switch may be used to detect the removal and addition of a scrubbing pad. In some embodiments, optical sensors coupled with software for detecting the wear of a scrubbing pad by comparing images of the scrubbing pad with stored images of a worn pad may be used to detect the replacement of the pad. Such sensors and software may also be used, in some embodiments, to trigger an update of the list of assistance criteria items when the scrubbing pad is worn. Additionally, any suitable system for detecting the replacement of the scrubbing pad may be used. Once the robot detects that the scrubbing pad has been replaced, an application executed by the a processor coupled to the robot may update the list of assistance criteria items to reflect the change.

In some embodiments, the list of assistance criteria items may comprise malfunctions in the robots systems or systems coupled to the robot. The robot's systems comprise both software and hardware systems. A malfunctioning system may comprise a system that is not functioning as specified in the robot's operating instructions. The instructions may be set by a manufacturer, seller, user, or operator of the robot. The system may be operating, for example, outside of a range of values set in the operating instructions. Operation outside the range of values may trigger an application executed by the robot to cause the malfunctioning system to be added to the list of assistance criteria items. For example, the robot may have a system for spraying water within a range of pressures. If the water spraying system is unable to spray water within the range of pressures specified, the robot may trigger an application to add the water spraying system to the list of assistance criteria items.

A monitoring application may be used to monitor robot's systems to determine if they are malfunctioning. In some embodiments, the monitoring application may be integrated within applications used for operating the robot's systems. Taking the example of the water spraying system, an application for monitoring a signal from a fluid pressure sensor may include instructions to launch, or have another application such as the robot's operating system to launch, an application to add the water spraying system to the list of assistance criteria items. In some cases, the robot's operating system may include instructions for detecting problems in the robot's systems. Applications for monitoring the robot's systems may be executed by any suitable processor.

In some embodiments, the processor for executing applications for monitoring the robot's systems may be coupled to the robot. For example, the processor for executing applications for monitoring the robot's systems may be the robot's CPU. As such, the CPU may detect malfunctions in the robot's systems, low running consumables, or other issues that a human worker may address.

In some embodiments, diagnostic software may be used for determining the nature of the malfunction or the extent of the malfunction. For example, the diagnostic software may attempt to determine whether a malfunction is due to a hardware problem or a software problem. The diagnostic software may use data from one or more sensors or the processor. For example, the diagnostic software may run a test on a drive system of a robot and determine the output of the drive system using measurements from a rotational motion sensor, such as gyroscope, for example, coupled to a drive shaft of the drive system to determine if the drive system is functioning according to the drive system's specifications. In certain embodiments, the diagnostic software may attempt to determine whether a reported malfunction is a malfunction in a system monitored by a sensor or a malfunction in the sensor itself. For example, a pressure sensor coupled to an air pressurization system of a robot may be sending data to the robot's processor indicating pressures lower than pressures specified for the air pressurization system. Diagnostic software may run a test on the sensor to determine if the sensor is operating within parameters set for the sensor.

Any suitable type of diagnostic software may be used. Additionally, any suitable sensor may be used with the diagnostic software. The results produced by the diagnostic software may be included in the list of assistance criteria items. In certain embodiments, the results of the diagnostic software may be wirelessly communicated to the worker selected to assist the robot.

In some embodiments, a malfunctioning system may comprise a power source that does not provide sufficient power to power the robot. In such embodiments, the power source may be added to the list of assistance criteria items. A battery requiring replacement or recharging may also be added to the list of assistance criteria items. A malfunctioning system may also comprise sensors coupled to the robot. For example, an optical sensor coupled to the robot may stop sending data to the robot's processor due to a malfunction. In some cases, a sensor may be sending data that does not fall within a set of parameters specified as signifying normal operation of the sensor. For example, the optical sensor may be sending images to the robot's processor that are of a lower resolution than the resolution specified for the optical sensor. The optical sensor may then be added to the list of assistance criteria items.

In certain embodiments, actuators coupled to the robot may be malfunctioning. For example, an actuator for turning a drive shaft of the robot may be malfunctioning. The robot's processor may detect that the robot is not moving as instructed by the processor. The processor may run diagnostic software to test the actuator. The diagnostic software may instruct the actuator to drive a shaft driven by the actuator. A sensor coupled to the shaft may provide a rotational speed of the shaft and the diagnostic software may determine if the actuator is driving the shaft as instructed by the software running the actuator. Based on the results, the actuator may be added to the list of assistance criteria items. In some embodiments, if the diagnostic software is unable to determine whether the actuator is malfunctioning or if some other malfunction in the drive system is causing the detected problem, the drive system may be added to the list of assistance criteria items rather than a specific actuator.

In some embodiments, communications systems may be added to the list of assistance criteria items. The robot's monitoring systems may detect a problem with the robot's communications systems. For example, the robot's monitoring systems may detect that a communications interface coupled to the robot has intermittent connectivity to a remote server and add the communications interface to the list of assistance criteria items. In some cases, diagnostic software may be used to determine the nature of the malfunction with the communications interface. For example, diagnostic software may be run to determine if the malfunction is a software malfunction or a hardware malfunction.

In certain embodiments, a failure by the robot to communicate with a remote server may trigger an assistance request to a worker. A list of assistance criteria items comprising a last known location of the robot may be used in making the assistance request.

In certain embodiments, the malfunction may be a software malfunction. The robot may have one or more software programs or applications for controlling the robot's systems. For example, a software program may control the operation of scrubbers on an autoscrubber. A failure of the software program to launch or a failure of any portion of the software program to launch may be considered a malfunction and added to the list of assistance criteria items. A crash by a program may also be considered a malfunction and added to the list of assistance criteria items. Other examples of malfunctions may include, without limitation, a watchdog timer timing out, a hard drive running out of space, a memory such as a random access memory being full, or a computer running too slow or being unable to keep up a certain desired loop/execution speed. In some embodiments, the localization or navigation software may malfunction. For example, the robot may become lost due to a malfunction with the navigation software. The navigation system may then be added as an assistance criteria item.

In certain embodiments, the robot may run into environmental obstacles. For example, the robot may run into an object that the robot is unable to get around. The robot may then request assistance, with the list of assistance criteria items including, for example, environmental obstacle as an assistance criteria. As another example, a robot may be unable to turn around in a tight area. This may be due to either a software or hardware malfunction, where the software is determining that the area is too tight or a sensor is not correctly determining the size of the area. However, in some embodiments, the problem may be that the area is actually too tight for the robot to turn in. The robot may have monitoring and diagnostic systems that may try to determine the cause of the problem. If the problem is that the area is too tight, the list of assistance criteria items may include, for example, environmental obstacle or any other suitable description as the assistance criteria item. If the robot's monitoring and diagnostic systems are unable to determine whether the problem is a software issue or an actual environmental issue, the list of assistance criteria may list either of the potential problems as an assistance criteria item. In some embodiments, all possible problems may be listed. In certain embodiments, a more generic listing that may be known to comprise software, hardware, or environmental problems, may be used. In some embodiments, where the choice is between an environmental problem and a software or hardware problem, the monitoring system may be configured to include on the list the problem seen as requiring a higher skill level. For example, the navigation software may be listed as an assistance criteria item instead of an environmental obstacle. The system may be configured to make such a selection because it may be determined that more of the available workers may be similarly equipped to assist the robot with an environmental problem but only a select few may have the skills to address issues with a software problem. As with consumable and replaceable items, the list of assistance criteria items may be updated once a malfunction has been resolved by removing the malfunction or malfunctioning system as an item from the list of assistance criteria items. Any suitable method may be used for updating the list of assistance criteria items. For example, the list of assistance criteria items may be updated to remove the item representing the malfunction manually by having a worker update the list of assistance criteria items. In some embodiments, the list of assistance criteria items may be updated automatically by an application, such as a monitoring application, that detects that the previously malfunctioning system is no longer malfunctioning. In some cases, a monitoring application may remove an item representing a malfunction from the list of assistance criteria items if the monitoring application no longer detects the malfunction.

A robot's location may also be added to the list of assistance criteria items. The robot's location may be determined using systems and methods similar to those discussed for determining a worker's location above. For locating a robot, a tracking device may be coupled to the robot. The tracking device may come pre-installed with the robot or may be retrofit to the robot. In certain embodiments, malfunctions with the tracking device or locating software may also be items that may be added to the list of assistance criteria items.

In some embodiments, a robot's location may also be sent to a selected worker along with a notification of the assistance call.

In some embodiments, monitoring software may be separately stored and separately run from the robot's other software. The list of assistance criteria items and application for making an assistance request may also be stored and run separately. This may allow the robot to be monitored and assistance requested if, for example, the operating system of the robot is malfunctioning. In certain embodiments, a secondary processor may be coupled to the robot. The secondary robot may be coupled to a communications interface and may be dedicated to running monitoring software and applications related to the dispatch system, such as an application for adding items to the list of assistance criteria items and an application for making an assistance request. Alternatively and additionally, any suitable processor of the robot may run applications related to the dispatch system.

Triggering the dispatch system may comprise launching or executing a ranking application. Referring again to FIG. 1, the processor 140 executes a ranking application for cross-referencing, for each of the plurality of workers 115, 116, the worker's corresponding list of worker criteria items with the robot's assistance criteria items. The ranking application ranks the workers 115, 116 based on the cross-referencing. The ranking application may be stored on a computer readable memory coupled to the robot and executed by a processor coupled to the robot. In some embodiments, the ranking application may be stored on a computer readable memory at a remote server, such as the application server 125, and executed by a processor at the remote server. In certain embodiments, the ranking application may be stored at a device carried by a worker and executed by a processor of the device carried by the worker. A list of worker criteria items for each worker and a list of assistance criteria items for each robot may be communicated to the processor that will execute the ranking application. Communication interfaces coupled to each robot and worker may allow a wireless exchange of lists of worker criteria items and lists of assistance criteria items.

The ranking application may cross-reference a list of worker criteria items for each worker with the list of assistance criteria items by matching items of the list of worker criteria items for each worker with corresponding items of the list of assistance criteria items. A list of matched items may be generated for each worker by the ranking application. The ranking application may then rank the workers based on the number of matches on the list of matched items for each worker. In some embodiments, the ranking application may tally the number of matches for each worker without generating a list of matched items.

Some items, such as location, may be considered a match by being present on the list of worker criteria items and the list of assistance criteria items. The ranking application may then compare the location for each worker by, for example, comparing a relative distance from the robot to each worker. The worker with the shortest relative distance may have the location retained as a matched item and added to the tally of matched items for that worker. The location may be removed from the tally of matched items for the other workers. If the relative distance is equal for two or more workers, the location may be added to the tally of matches for each of those workers.

The ranking application may determine the relative distance between a worker and a robot using a path of travel, as discussed earlier. In some embodiments, the ranking application may simply determine a straight line distance between a location of the worker from a location of the robot and use the straight line distance for comparing relative distances for each worker. In certain embodiments, a relative distance between a robot and a worker may have been entered as the location item in the list of worker criteria items rather than a location, allowing the ranking application to compare the distances as entered on each list of worker criteria items.

Locations of workers that are within a set distance of the robot may be considered to be the same location by the ranking application. For example, the ranking application may set the location of a second worker to be the same as the location of a first worker if the locations of each of the two workers are within, for example, five meters of the robot. In certain cases, locations of workers that are within a set distance of each other may also be considered to be the same location by the ranking application. In some embodiments, relative distances between a robot and two or more workers that are each within a set distance of the robot may be considered equal by the ranking application. For example, the ranking application may consider a relative distance between a robot and a first worker to be equal to the relative distance between the robot and a second worker if the actual relative distances are within fifteen meters of each other. Any suitable distance may be used as the set distance. Alternatively or additionally, relative distances may be rounded off according to a pre-set formula. For example, relative distances may be rounded to the closest tenth meter or nearest twentieth meter. In certain embodiments, a user or operator may be able to set the set distance or pre-set formula.

By setting relative distances or locations to be equal for different workers if they are located within a certain distance of the robot, the ranking application may avoid giving too much preference to location as a deciding factor in selecting a worker in cases where the workers are relatively close to each other. When workers are located relatively close to each other or within a certain distance of the robot, the travel time may not be a decisive issue in selecting a worker. Other criteria may have greater relevance to which worker may be best suited to assist the robot.

In some embodiments, the worker criteria items may include skills or tools that are rated, as discussed earlier. For example, a worker with expertise in resolving malfunctions in pneumatic systems may have his or her skill rated as expert instead of novice. In some cases, the worker's skill may be rated using a numerical value. For example, a particular skillset may be rated as a nine for one worker and a three for another worker. In these embodiments, if the skillset matches a corresponding item on the list of assistance criteria items, the ranking application may add the skill to the tally of matches for the worker with the higher rated skill level and not for the worker with the lower rated skill. In certain embodiments, the ranking application may award the worker with a higher rating for a particular skill an additional match when tallying the number of matches for each worker and a single match for the worker with the lower rating. Additionally and alternatively, the ranking application may use any suitable formula for adding the skill to the tally of matches.

In some embodiments, a worker may have several items on the list of worker criteria items that correspond to a single item on the list of assistance criteria items. For example, the worker may have a tool and a skill both corresponding to the same item on the list of assistance criteria items. In these embodiments, each of the items on the list of worker criteria items that correspond to a single item on the list of assistance criteria items may count as a separate match.

In some embodiments, the ranking application may assign a relative weight value to items on the list of worker criteria items for each worker and/or to items on the list of assistance criteria items. Using a relative weight value may allow some items on the list of worker criteria items or on the list of assistance criteria items to have a priority over other items. For example, a user of the dispatch system may consider the possession by a worker of a skill related to a navigation system of a robot as a higher priority than a relative distance between the robot and the worker. When the list of assistance criteria items and the list of worker criteria items are cross-referenced, a match involving the skill with the navigation system may be given a higher weight than a match for relative distance. For example, the navigation system skill match might receive a weight of 1.5 versus a weight of 1 for the relative distance. Any suitable relative weight values may be assigned.

In some embodiments, weight values may be assigned to an item based on a value of the item relative to other instances of that item. For example, the item may be a location. Different instances of that item, in this case location, may have different values. A weight value may be assigned to location based on the relative distance of the location to the robot. Workers with a relative distance falling within a first configurable range may have a higher weight assigned to the location on their worker criteria items list than workers whose relative distance to the robot falls within a second configurable range, where the first configurable range contains shorter relative distances than the second configurable range. The ranking application may then add the weighted value of the location to the tally of matches for each worker.

In certain embodiments, a worker assistance item, such as a skill or a tool, may have a rating, as discussed earlier. For example, a worker may have an expert rating for a certain skill. The ranking application may assign a weight to the worker assistance item based on the rating of the skill or tool. For example, an expert rating for a skill may result in a higher relative weight being assigned to the skill than a novice rating.

In certain embodiments, the relative weight values may be configurable. For example, a worker may access the list of worker criteria items or the list of assistance criteria items at a terminal and assign relative weight values to items. The terminal may be any suitable terminal for accessing the criteria being adjusted. For example, the terminal may be at a remote server. In some embodiments, the terminal may be coupled to a device carried by a worker. In certain embodiments, the terminal may be coupled to a robot.

In some embodiments, the ranking application may change a relative weight value for an item of the list of worker criteria items based on the list of assistance criteria items. For example, a diagnostic tool for running diagnostics on the drive system of robot may have a low relative weight value when matched with an item on the list of assistance criteria items showing a very specific problem with the drive system. The monitoring system for the robot may have already narrowed the malfunction down and the diagnostic tool may have limited usefulness. In other cases, however, where the list of assistance criteria items show a general issue with the drive system, the diagnostic tool may receive a higher relative weight value due to its potential for determining the malfunction. The ranking application may provide for any suitable change of relative weight values of items based on other items or matches.

In some embodiments, changing the relative weight value of items by the ranking application may be based on a set of rules encoded into the ranking application. The rules may be updatable by, for example, a worker. In certain embodiments, the ranking application may use machine learning to update the rules for changing the relative weight value of items. An application may evaluate rankings and assigned weight values over a period of time for a particular trait. The trait may be, for example and without limitation, the fastest time to resolve a problem with a robot, the highest probability of resolving a problem with the robot, or a highest rating in a survey filled out by a worker or someone responsible for the work being performed by the robot. A machine learning algorithm may be trained to find an optimal value of weight values for assistance criteria items based on the particular trait. The ranking application may then assign the optimal weight values to the assistance criteria items.

Figure 7:
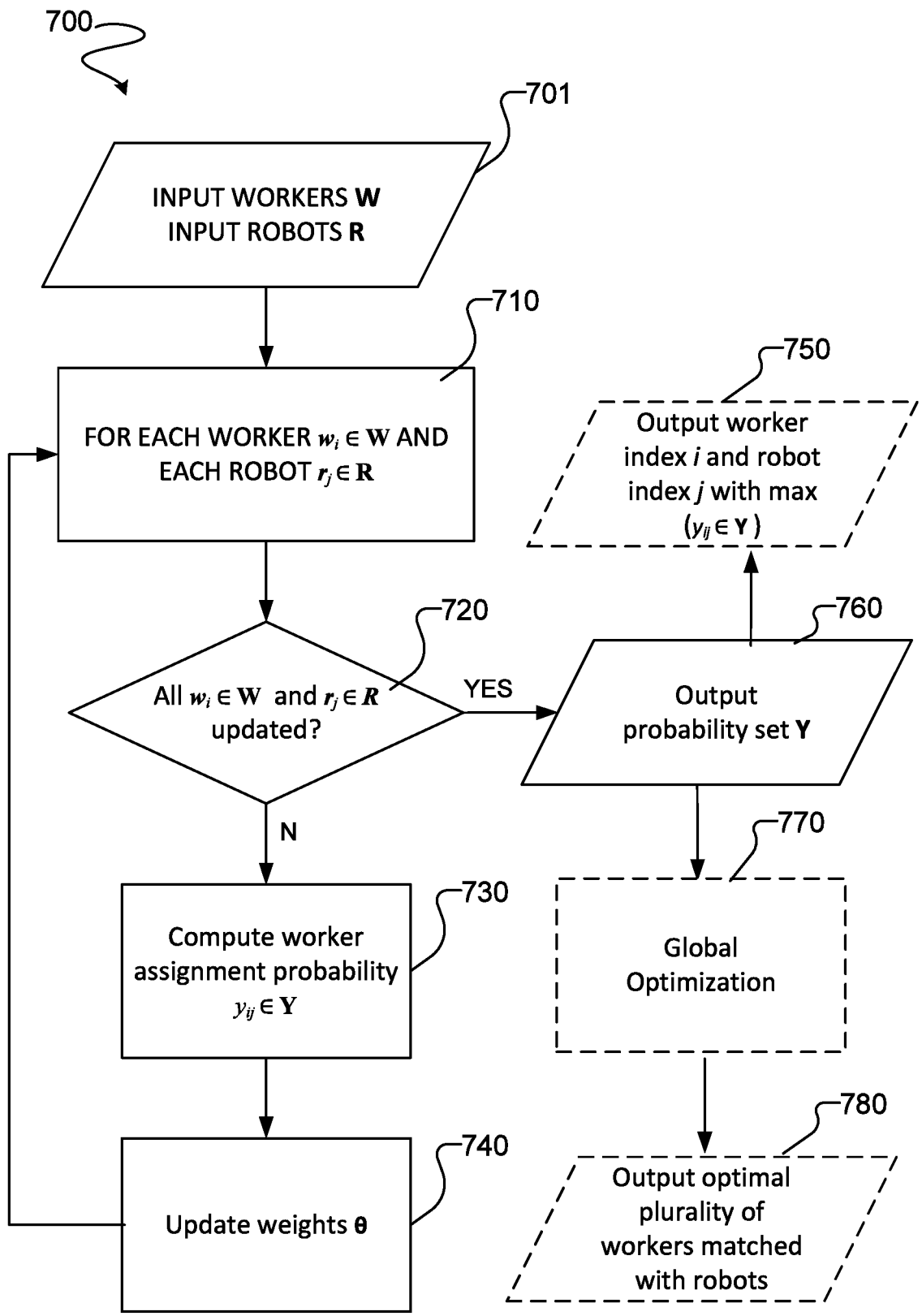
FIG. 7 is a flow chart of a method for generating a ranking of worker-robot pairs which implements a machine learning algorithm and which may be performed by a ranking application according to a particular embodiment.

FIG. 7 is a flow chart of a method 700 for generating a ranking of worker-robot pairs which implements a machine learning algorithm and which may be performed by a ranking application according to a particular embodiment. Machine learning algorithm 700 comprises inputs 701. Inputs 701 in the illustrated embodiment comprise: a worker set (or matrix) W for a group of m workers, the matrix W being made up of a set of worker lists (or vectors) $w_i$ (i=1 ... m) with one worker vector $w_i$ for each worker and i representing an index identifying a corresponding one of the plurality of m workers; and a set (or matrix) R for a group of n robots, the matrix R being made up of a set of robot lists (or vectors) $r_j$ (j=1 ... n) with one robot vector $r_j$ for each robot and j representing an index identifying a corresponding one of the plurality of n robots. Each element of worker vector $w_i$ may comprise a worker criteria item. Non-limiting examples of worker criteria items include {location, experiencef_level, job_queue, unavailable, nav_exp, clean_exp, general_exp}. Each element of robot vector $r_j$ may comprise an assistance criteria item. Non-limiting examples of assistance criteria items include {location, navigation error, cleaning error, miscellaneous error}.

The output 760 of the FIG. 7 method 700 is a set (or matrix) Y made up of probabilities $y_{ij}$ for the $i^{th}$ worker to assist the $j^{th}$ robot. The relative magnitudes of the probabilities $y_{ij}$ within the set Y determining a relative ranking of the probabilities $y_{ij}$. For example, a probability $y_{ij} \in Y$ with a relatively large magnitude (relative to other elements of the matrix Y) may be indicative of a relatively greater desirability to dispatch the $i^{th}$ worker to assist the $j^{th}$ robot.

Optionally, as shown in block 750, method 700 may output the worker i and the robot j which have the highest probability $y_{ij}$ from among the elements of probability matrix Y to be a selected worker and selected robot—i.e. a selected (matched) worker-robot pair. A notification application (as described elsewhere herein, but not shown in FIG. 7) may notify the selected worker of an assistance request from the selected robot. The selected worker may be asked to reply with an acceptance of the assistance request. Once the selected worker i has accepted the assistance request of the selected robot j, method 700 may be performed again with selected worker i removed from the input matrix W and with selected robot j removed from the input matrix R.

As an additional or alternative option, shown in blocks 770 and 780, method 700 may perform a global optimization at block 770 which outputs, in block 780, an optimal plurality of selected workers with a corresponding plurality of selected robots (i.e. an optimal plurality of selected (matched) worker-robot pairs). The block 770 optimization may perform a global optimization over the set Y of probabilities which minimizes some suitable cost (objective) function. Block 770 may comprise any suitable computer-implemented optimization or linear programming technique. By way of non-limiting example, block 770 may involve implemented the so-called Hungarian method. In some embodiments, block 770 involves an optimization process that is similar to that described above in method 600 (FIG. 6) and equations (3) to (8), where the equation (3) cost matrix Y is replaced with the machine learning probability matrix Y (e.g. probability matrix Y output in block 760 of method 700). In this sense, the machine learning loop of blocks 710, 720, 730, 740 of method 700 (FIG. 7) may take the place of the cost computation loop blocks 620, 630, 640 of method 600 (FIG. 6).

Figure 8:
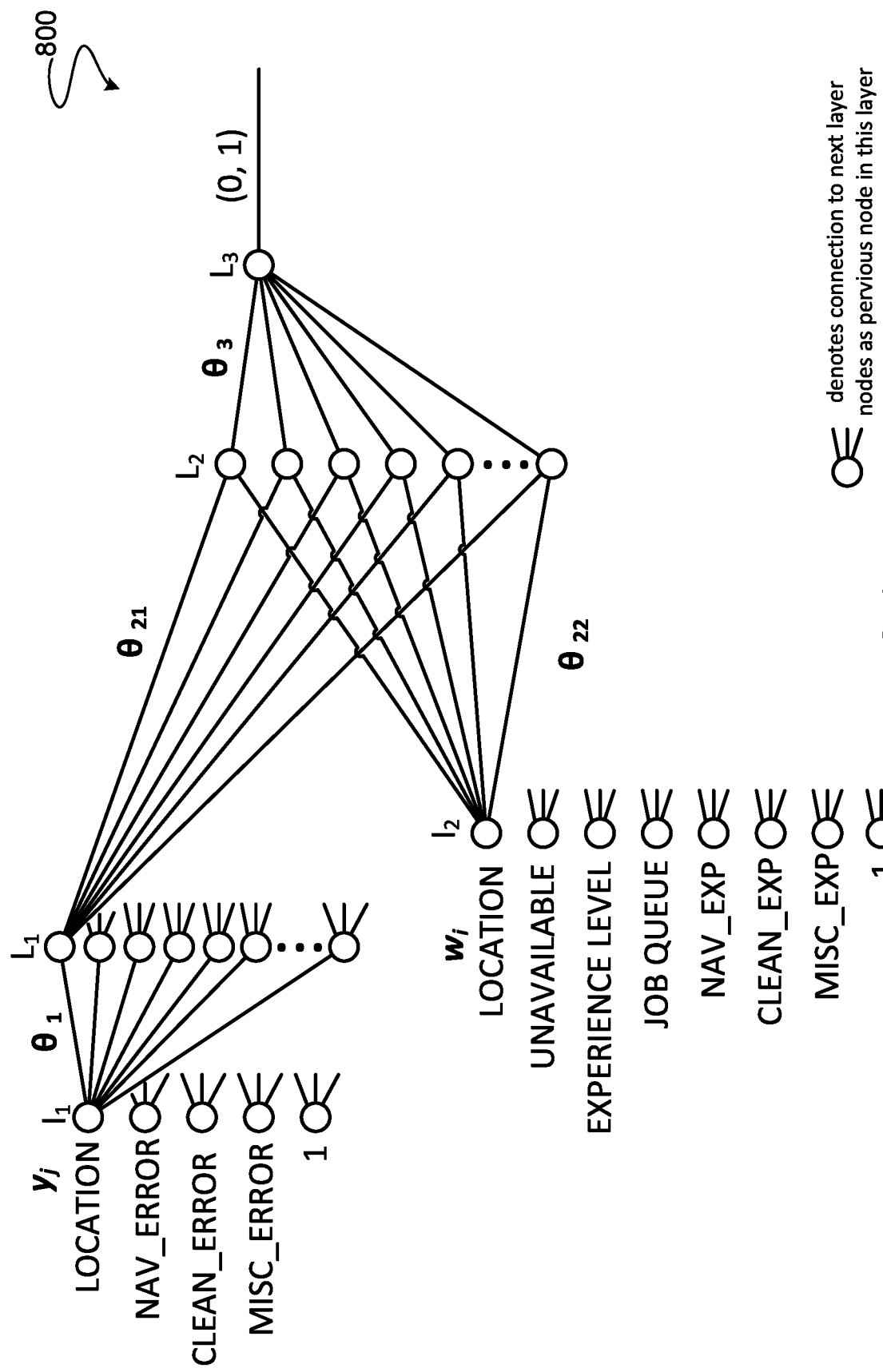
FIG. 8 schematically depicts an architecture of nodes and layers of an example embodiment of the FIG. 7 machine learning method.

FIG. 8 schematically depicts the architecture 800 of nodes and layers of an example embodiment of the FIG. 7 machine learning method 700.

W represents a set (or matrix) of m workers, the matrix W being made up of a set of worker lists (or vectors) $w_i$ (i=1 ... m) with one worker vector $w_i$ for each worker and i representing an index identifying a corresponding one of the plurality of m workers;

R represents a (or matrix) of n robots, the matrix R being made up of a set of robot lists (or vectors) $r_j$ (i=1 ... n) with one robot vector $r_j$ for each robot and j representing an index identifying a corresponding one of the plurality of n robots;

FIG. 8 is shown with the above-described exemplary worker and assistance criteria items, it being understood that these criteria items are non-limiting examples used for the purpose of illustration.

Referring the FIGS. 7 and 8, method 700 may be implemented as a neural network architecture 800 which comprises two input layers $I_1$ and $I_2$ respectively for each robot vector $r_j$ and worker vector $w_i$. The first hidden layer $L_1$ (FIG. 8) normalizes the input vector $r_j$, for example, according to the function:

$$O(L_1) = f_1(\theta_1 r_j^T) \quad (9)$$

where $f_1$ is an activation function and $\theta_1$ is a weight matrix, as described in more detail below. The equation (9) normalization may be performed as a part of block 730 (FIG. 7) based on weight matrix $\theta_1$ ascertained in a previous iteration of block 740.

The second hidden layer $L_2$ (FIG. 8) normalizes the input vector $w_i$ and factors in weight matrix $\theta_1$ from the output of layer $L_1$, for example, according to the function:

$$O(L_2) = f_2(\theta_{21} O(L_1)^T + \theta_{22} w_i^T) \quad (10)$$

where $f_2$ is an activation function and $\theta_{21}$ and $\theta_{22}$ are weight matrices. The equation (10) normalization may be performed as a part of block 730 (FIG. 7) based on weight matrices $\theta_{21}$ and $\theta_{22}$ ascertained in a previous iteration of block 740.

The third layer $L_3$ (FIG. 8) may return a probability $y_{ij}$ specifying the desirability of the fit between a worker i and the robot j. In some embodiments, the third layer $L_3$ may be expressed according to the function:

$$y_{ij} = O(L_3) = f_3(\theta_3 O(L_2)^T) \quad (11)$$

where $f_3$ is an activation function and $\theta_3$ is a weight matrix, as described in more detail below. The equation (11) computation may be performed as a part of block 730 (FIG. 7) based on weight matrix $\theta_3$ ascertained in a previous iteration of block 740.

$\theta_1$, $\theta_{21}$, $\theta_{22}$, $\theta_3$ are weight matrices between each of the layers of the neural network. Functions $f_1$ and $f_2$ may be logistic or tan h activation functions. Function $f_3$ may be a softmax activation function. For example, in some embodiments, $$f_2(x) = f_1(x) = \frac{1}{1+e^{-x}}. \quad (12)$$

In some embodiments, $$f_2(x) = f_1(x) = \tanh(x) = \frac{2}{1+e^{-2x}} - 1. \quad (13)$$

In some embodiments:

$$f_3(x_{ij}) = \frac{e^{x_{ij}}}{\sum_{m=1,n=1}^{M,N} e^{x_{mn}}}. \quad (14)$$

The error back propagation $E(\theta)$ may be updated in each iteration of block 740 and may use squared error proportional to the distance $(d(w_i)-d(r_j))$ between the robot j and worker i, for example, according to the function:

$$E(\theta) = (y_{ij} - \hat{y}_{ij}(r_j, w_i, \theta))^2 \times (d(w_i) - d(r_j))^2 \quad (15)$$

wherein d( ) denotes a location of the worker or robot as the case may be and $\hat{y}_{ij}$ is the expected output for the given input in the training dataset. This value may be a probability between 0 and 1. The $\hat{y}_{ij}$ value may be generated from a combination of user data and/or synthetic data. Advantageously, the error back propagation $E(\theta)$ is independently based on the distance between the worker and the robot—i.e. $(d(w_i)-d(r_j))$.

Returning to FIG. 7, method 700 comprises a feed-forward path where the output probabilities $y_{ij}$ that populate the matrix Y are computed in block 730 using activation functions $f_1, f_2, f_3$ in each layer. Activation functions $f_1, f_2$ may comprise logistic or tan h functions (e.g. equations (12) or (13)) in the hidden layers, and a softmax function (e.g. equation (14)) at the output layer. The dynamic weight matrices $\theta_1, \theta_{21}, \theta_{22}, \theta_3$ in each layer are updated using an error function (e.g. equation (15)) in each iteration of block 740.

In certain embodiments, the list of assistance criteria items and the lists of worker criteria items may include corresponding items that result in a worker being selected by default. For example, a robot may experience a malfunction that only one worker is equipped to handle. The worker may be the only worker with a tool needed to resolve the malfunction. In such a case, the ranking application may disregard any other matches for any other worker and rank the worker with the tool for resolving the malfunction ahead of all other workers. In some embodiments, the ranking application may update the relative weight value of the item needed to resolve the malfunction to a level that ensures the worker with that item will be ranked at the top. The remaining workers may also be ranked, but below the worker with the item for resolving the malfunction. In certain embodiments, the ranking application may select the worker with the item for resolving the malfunction by default without ranking the remaining workers. If more than one worker has the item needed for resolving the malfunction, the ranking application may rank those workers against each other using other matches with the list of assistance criteria items while ensuring the workers with the item for resolving the malfunction are ranked above all the other workers. In some cases, the ranking application may not rank the other workers. In some embodiments, none of the lists of worker criteria items may contain an item for resolving a malfunction listed in a list of assistance criteria items. In these embodiments, the ranking application may rank the workers based on the items listed on the list of worker criteria items.

Any suitable item on a list of worker criteria items may result in the ranking application selecting by default the worker corresponding to the list.

In some embodiments, an application may send a notification of an assistance request to a worker selected by or ranked above other workers by the ranking application. In some cases, the ranking application may be the notification application. The notification of the assistance request may be communicated from a communication interface coupled to a robot or from a communications interface at a remote server. In certain embodiments, the remote server may be carried or worn by a worker.

The notification may be communicated wirelessly to a device carried or worn by the worker. In certain embodiments, the notification may be sent to a terminal at a location the worker is close to. For example, the worker may be stationed in a supply room. The notification may be received at a computer in the supply room. Alternatively or additionally, the notification may be sent to a remote server and may be forwarded to the worker from the remote server. In some cases, a human or automated dispatcher at a remote location may receive the notification and may notify the worker. For example, the dispatcher may call the worker, send a text message to the worker, send an email to the worker, page the worker over a loudspeaker, speak to the worker using a two-way radio transceiver, speak to the worker directly, or use any suitable communication system to notify the worker of the assistance request.

The notification of the assistance request may be accompanied with a location of the robot and diagnostic information from the robot. The location may be provided as coordinates. In some embodiments, the location may be provided as a location name. For example, an application may have converted the location coordinates of the robot to a location name, such as front foyer, based on mapping information accessible to the application. In certain embodiments, a location and/or diagnostic information may be sent if a worker accepts an assistance request.

In some embodiments, the notification application may notify a second worker of the assistance request if the first worker does not accept the assistance request. The second worker may be the worker ranked in second place by the ranking application. Similarly, the notification application may notify a third worker if the second worker does not accept the assistance request and work down the list of ranked workers until a worker accepts the assistance request. If all of the workers fail to accept the assistance request, the notification application may return to the top of the list of ranked workers and continue sending notifications until a worker accepts the assistance request.

In some embodiments, a worker may actively reject an assistance request. For example, the worker may enter an input into an input terminal, which may be, for example, a handheld device carried by the worker, to reject the assistance request. In certain embodiments, the worker may have a period of time for accepting the assistance request. Any suitable period of time may be used. For example, the worker may have five minutes to accept the assistance request before the request is sent to a second worker. The worker may accept the request by, for example, entering an input at an input terminal. Any suitable type of input may be used. For example, the worker may use a verbal input to accept the call. In some embodiments, the worker may enter an input using, for example, a keypad or a touchscreen. In the case of a touchscreen, the worker may, for example, press or swipe an icon on the worker's handheld device to accept or reject the assistance request.

In some embodiments, a first ranked worker may conditionally accept the assistance request. For example, the first ranked worker may be temporarily busy. The first ranked worker may choose to accept the assistance request but may add in a time for when the first ranked worker may be able to attend to the robot. For example, the first ranked worker may enter a time of thirty minutes. The notification application may then notify a second ranked worker of the assistance request and the conditional acceptance by the first ranked worker. If the second ranked worker is able to attend to the robot before the time noted in the conditional acceptance, the second ranked worker may accept the request. The first ranked worker may be notified of the acceptance by the second ranked worker.

In certain embodiments, a worker on an assistance call may be listed as unavailable. The worker may be able to change the workers status to available once the worker is no longer busy. In some embodiments, the worker may automatically be listed as available once the robot being serviced no longer has a triggering item on the list of assistance criteria items. Being available may simply mean that the list of worker criteria items for that worker is available for cross-referencing. If the worker is unavailable, the ranking application may exclude the list of worker criteria items for that worker. In some cases, the list of criteria for the unavailable worker may be unavailable to the ranking application. For example, in some dispatch systems, the ranking application may directly download lists of worker criteria items from devices carried by the workers. If a worker is unavailable, the device may not send the list to the computer running the ranking application. Alternatively or additionally, a worker on a service call may be considered available for the purposes of the ranking application. If selected and notified, the worker may reject the request or accept conditionally.

Figure 4:
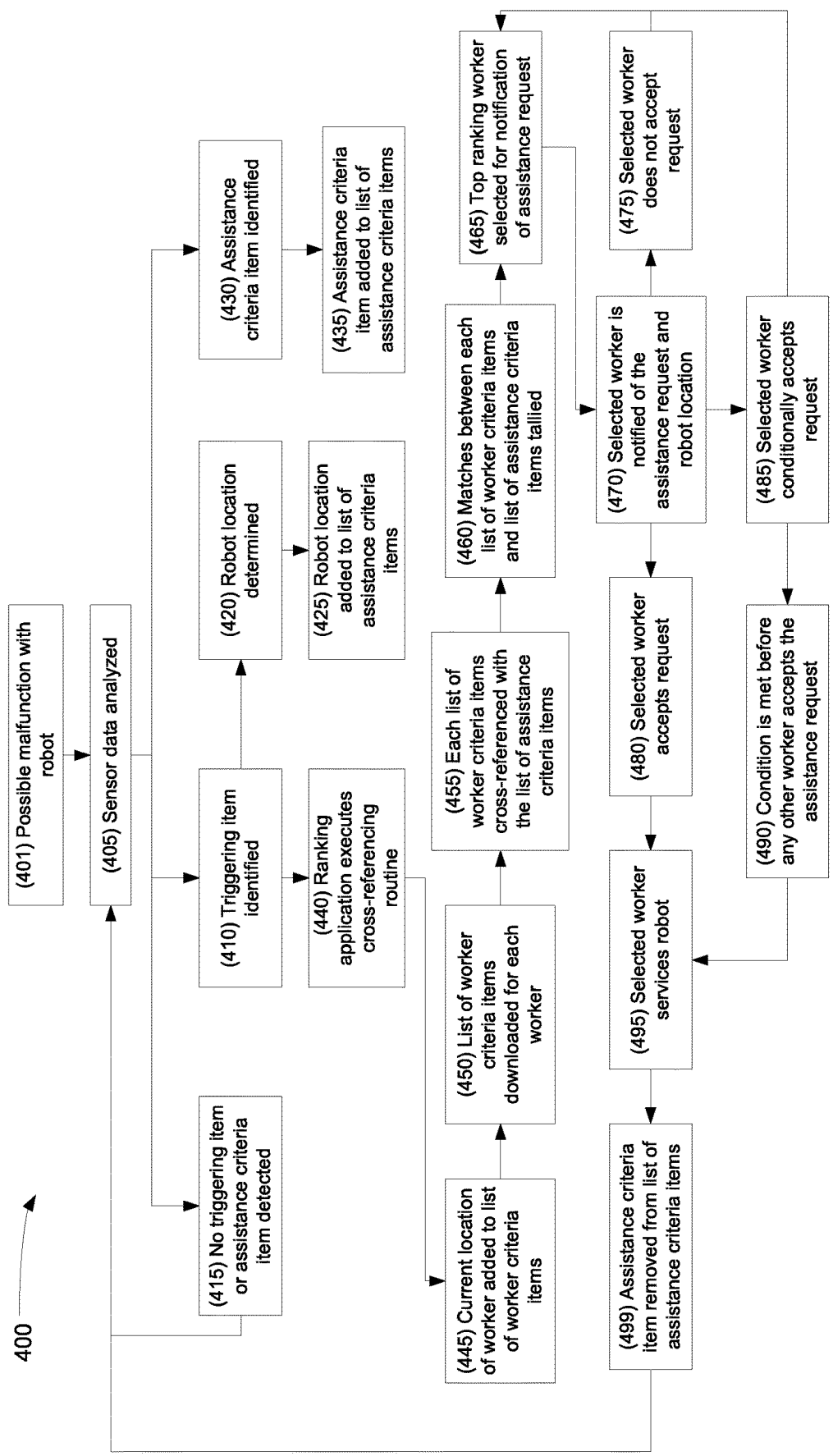
FIG. 4 is a flow diagram of a dispatch system for assisting a robot according to a particular embodiment.

Referring to FIG. 4, a flow diagram of the dispatch system 500 is shown. The dispatch system 400 may be used, for example, to dispatch workers to provide assistance to a fleet of janitorial services robots. The fleet may comprise, for example, five cleaning robots and there may be three workers available to respond to assistance requests. The workers and the robots may be spread out through a large facility such as a hospital. At box 401, a possible malfunction may occur. For example, one of the cleaning robots may experience a malfunction with a water spraying system. A flowrate meter coupled to a nozzle for spraying the water may detect a decrease in the flow rate. At box 405, a monitoring application may analyse the data from the flowrate meter. At box 410, sensor data corresponding to a triggering item may be identified. If a triggering item is not identified, as at box 415, the monitoring application may continue analysing the sensor data. At box 430, the monitoring application may also identify sensor data corresponding to an assistance criteria item. In some embodiments, the assistance criteria item may be the same as the triggering item. In certain embodiments, an assistance criteria item that differs from the triggering item may be identified. A list of assistance criteria may be generated and, as at box 435, the assistance criteria item, in this case the water spraying system, may be added to the list. In some embodiments, the list may already exist and the monitoring application may simply add the water spraying system to the list or select the water spraying system as an assistance criteria item on the list.

At box 420, a location of the robot may be determined and at box 425, the robot location may be added to the list of assistance criteria items along with the water spraying system. The locating software may be set-up to determine the coordinates of each robot and each worker.

At box 440, the identification of a triggering item in the sensor data may trigger a ranking application to execute a cross-referencing routine. Any suitable application, including but not limited to the ranking application, may cause a computer of the robot to communicatively couple with a device carried by, worn by, or located in the vicinity of a worker to download a list of worker criteria items for that worker. This may be done for each worker. At box 445, a current location of each worker is added to that worker's list of worker criteria items. At box 450, the list of worker criteria items may be wirelessly downloaded for each worker. In certain embodiments, the robot may communicate with a remote server that may provide a list of worker criteria items for each worker. At box 455, the cross referencing routine may then compare each list of worker criteria items with the assistance criteria items. At box 460, matches between each list of worker criteria items and the list of assisted criteria items may be tallied. In the current example, each worker may have similar lists of worker criteria items, resulting in the same number of matches. One worker, however, may have a much shorter relative distance to the robot, resulting in that worker being ranked above the other two workers. At box 465, the top ranked worked is selected for notification of an assistance request from the robot. At box 470, a notification may be sent to the selected worker. The notification may include the robot's location and diagnostic information. At box 480, the selected worker accepts the assistance request. In some embodiments, a diagnostic report and location of the robot may be sent to the selected worker if the selected worker accepts the assistance request rather than with the notification. At box 495, the selected worker services the robot, resulting in the assistance criteria item being removed from the list of assistance criteria items at box 499.

In the meantime, a second robot may have made an assistance request due to a leak in a cleaning detergent dispensing system. A monitoring system may have detected that the cleaning detergent has run out an hour earlier than it was supposed to. A diagnostic check on the robot may have indicated that the flow rate through a dispensing nozzle was normal, suggesting a leak in the detergent storing system or in fluid lines carrying the detergent. A monitoring application may have added leaking cleaning detergent as an item to the list of assistance criteria items. A locally stored ranking application may again download lists of worker criteria items from the workers. In this case, since the first worker is on an assistance call and unavailable, the ranking application may download lists of worker criteria items from the two available workers. A worker may be selected based on the comparison by the ranking application. This worker may be busy receiving a shipment of cleaning supplies, for example, and unable to attend to the robot. At box 475, the selected worker does not accept the assistance request. The worker may reject the assistance request by swiping an icon displayed by an app on this worker's mobile phone. The ranking application may then select the third worker as the top ranking worker and notify this worker of the assistance request. The third worker may accept the request. A diagnostic report and location of the robot may then be wirelessly communicated to the third worker. The third worker may then proceed to the robot.

In some embodiments, the top ranked worker may conditionally accept the assistance request, as at box 485. The worker may, for example, be busy attending to another robot for the next 30 minutes. In this case, the ranking application may select the next ranked worker as the top ranking worker and notify this worker of the assistance request and of the conditional acceptance. This worker may accept the request if, for example, this worker is available in the next thirty minutes. If, as at box 490, no worker accepts the assistance request before the thirty minute condition is met, the worker that made the conditional acceptance may service the robot.

Figure 5:
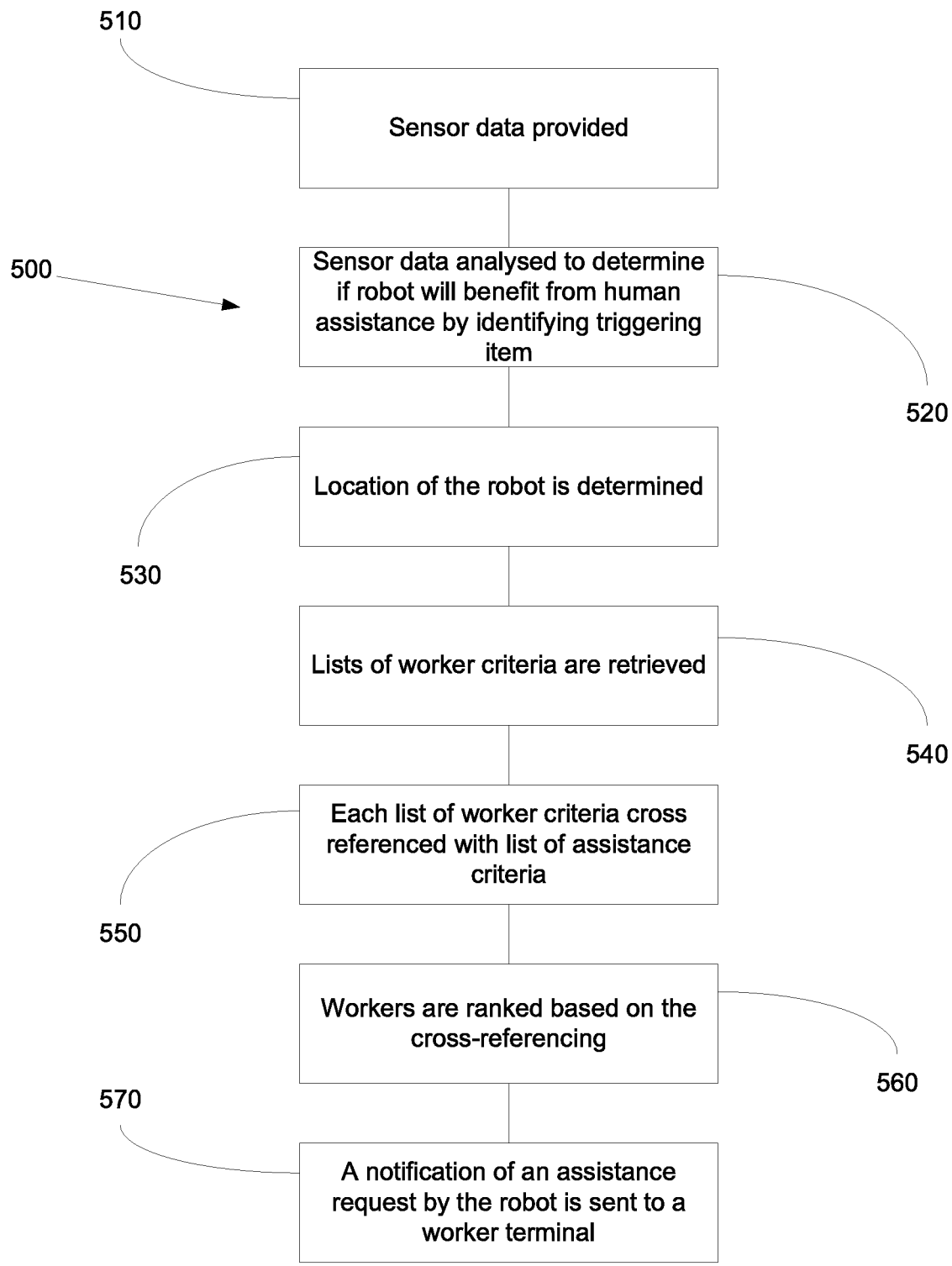
FIG. 5 shows a dispatch method for selecting and notifying a worker of an assistance request for a robot.

Referring to FIG. 5, a dispatch method 500 for selecting a worker from among a plurality of workers to assist a robot is shown. At box 510, a monitoring application of the robot may be provided with sensor data. The sensor data may be based on data from one or more sensors coupled to the robot. In some embodiments, the sensor may comprise a processor coupled to the robot, such as, for example, the robot's CPU. The sensor data may be raw data from one or more sensors or processed data based on data generated by a sensor. For example, a sensor may produce raw data that is then processed by a processor into data that may be used by the monitoring application.

At box 520, the monitoring application, which may comprise a triggering application, may analyse the sensor data to determine if the robot may benefit from assistance from a human worker. The monitoring application may determine that the robot may benefit from assistance from a human worker for many different reasons. These reasons may include, without limitation, a detection of a malfunction in one of the robot's systems, a determination that a consumable carried by the robot is running low, a determination that some part coupled to the robot should be replaced, or a determination that the robot may benefit from the addition of a tool or item available to the human workers. Alternatively and additionally, any suitable reason for requesting assistance from a human worker may be used as a reason for requesting assistance.

Analysing the sensor data to determine if the robot may benefit from human assistance may comprise analysing the sensor data to identify triggering data corresponding to a triggering item within the sensor data. Analysing sensor data to identify triggering data may itself comprise matching sensor data to triggering data in a triggering data set from a triggering list, wherein the triggering item corresponds to the triggering data set.

In some embodiments, the reason for determining that the robot may benefit from human assistance may be added as a triggering item to a list of assistance criteria items. A user, including anyone working on the robot, such as, without limitation, a worker, a programmer, or an owner of the robot may configure which reasons are to be triggering items. Any suitable reason for determining that the robot may benefit from human assistance may be set as a triggering item. For example, systems or supplies used by the robot for performing a primary function of the robot may be set as triggering items.

In certain embodiments, a triggering item may be added to a field on the list of assistance criteria items that is reserved for triggering items. An application that reads an item in the field for triggering items may launch the dispatch system. In some embodiments, the list of assistance criteria items may be integrated with an application for launching the dispatch system. The application may be, for example, a ranking application for ranking the workers. Adding a triggering item to the list may be considered a command to begin the ranking process.

The list of assistance criteria items for the robot may be stored on a computer readable memory coupled to the robot, a device carried by a worker, or a remote server. In some embodiments, the list of assistance criteria items may be stored on computer readable memories at multiple locations.

Assistance criteria items may be based on sensor data. Sensor data corresponding to issues with the robot may be added as assistance criteria items to the list of assistance criteria items. In some embodiments, a representation of the sensor data corresponding to an issue with the robot may be used as an assistance criteria item. The representation may comprise, for example, a description, a title, or a label. Assistance criteria items may comprise triggering items.

At box 530, a location of the robot may be determined. The location may be determined using systems and methods described earlier. The location may be added to the list of assistance criteria items. Similarly, a location for each worker may be added to the list of worker criteria items for the respective worker. In some embodiments, a relative distance between the robot and each worker may be added to the list of worker criteria items for each respective worker.

At box 540, lists of worker criteria items for each of a plurality of workers are retrieved by a ranking application. The ranking application may be stored at and executed at a computer coupled to, for example, any of the robot, a device carried by a worker, or a remote server. Each list of worker criteria items may be stored on and retrieved from a computer readable memory coupled to a device carried by the worker that the list of worker criteria items corresponds to. In some embodiments, each list may be stored on and retrieved from a computer readable memory at a remote server. In certain embodiments, each list of worker criteria items may be stored on and retrieved from a computer readable memory coupled to a robot.

At box 550, each list of worker criteria items may be cross-referenced with the list of assistance criteria items in response to an identification of trigger data within the sensor data. A ranking application may cross-reference the lists by matching items on each list of worker criteria items with corresponding items on the list of assistance criteria items. For example, a skill or tool related to the robot's drive system may be matched as an item on a list of worker criteria items with a drive system as a corresponding item on the list of assistance criteria items for the robot. Correspondences between worker criteria items and assistance criteria items may be configurable.

Cross-referencing may comprise matching worker criteria items with corresponding assistance criteria items. The matched items for each list of worker criteria items may be tallied.

Locations may be converted to relative distances for each worker by calculating a distance between each worker and the robot using location coordinates provided on the lists of worker criteria items and the list of assistance criteria items. In some embodiments, the lists of worker criteria items may comprise relative distances in addition to or in place of location coordinates. Once relative distances have been obtained, the relative distances for each worker may be compared to determine the worker with the shortest relative distance. The worker with the shortest relative distance to the robot may have an extra match added to their tally of matches.

In some embodiments, the locations may be separately compared for each worker without being added to the lists of worker criteria items. The worker located closest to the robot may have a match added to their tally.

In some embodiments, items on the list of worker criteria items for each worker may have relative weight values assigned to them. In certain embodiments, the relative weight values may be adjusted based on matches between items on the list of worker criteria items for each worker and corresponding items on the list of assistance criteria items. Assigning weights may result in certain matches of items on the list of worker criteria items for a worker with corresponding items on the list of assistance criteria items counting for more than other matches when the matches are tallied.

At box 560, the workers may be ranked based on the cross-referencing. Workers may be ranked by the number of matches tallied for each worker. In some embodiments, one worker of the at least two workers may be selected for notification by default when an item on the list of worker criteria items for the one worker matches a corresponding default item on the list of assistance criteria items.

At box 570, a notification of an assistance request by the robot is sent for the top ranked worker to a worker notification terminal. The notification may be sent by a communications terminal coupled to the computer that executed the application that ranked the workers. The notification may include a location of the robot and diagnostic information of the robot.

In some embodiments, a second notification of the assistance request may be sent to a second ranked worker of the plurality of workers. The second notification may be sent in response to the top ranked worker not accepting or failing to accept the assistance request. In certain embodiments, a conditional acceptance of the assistance request may be received from a notified worker. The conditional acceptance may comprise a time component indicative of when the notified worker will provide assistance to the robot. For example, the notified worker may be working on another assistance request or another assignment and so, may not be able to attend to the assistance request for some period of time. Following the receipt of a conditional acceptance, another worker may be automatically notified of the assistance request and the conditional acceptance. This other worker may then accept the assistance request. If this other worker accepts the assistance request, a further notification may be sent to the worker that conditionally accepted the assistance request, informing this worker that another worker has accepted the assistance request.

The terminology used herein is for the purpose of describing particular embodiments only and is not intended to be limiting. Accordingly, as used herein, the singular forms "a", "an" and "the" are intended to include the plural forms as well, unless the context clearly indicates otherwise. It will be further understood that the terms "comprises" and "comprising," when used in this specification, specify the presence of one or more stated features, integers, steps, operations, elements, and components, but do not preclude the presence or addition of one or more other features, integers, steps, operations, elements, components, and groups.

It is contemplated that any part of any aspect or embodiment discussed in this specification can be implemented or combined with any part of any other aspect or embodiment discussed in this specification.

While particular embodiments have been described in the foregoing, it is to be understood that other embodiments are possible and are intended to be included herein. It will be clear to any person skilled in the art that modifications of and adjustments to the foregoing embodiments, not shown, are possible.

The invention claimed is:

1. A system for providing one or more assistance requests to a plurality of workers, the system comprising:
a computer comprising a processor and a computer readable memory;
for each of a plurality of m workers, a corresponding worker list $w_i$ of worker criteria items stored on the computer readable memory, an index i identifying a corresponding one of the plurality of m workers;
for each of a plurality of n robots, a corresponding robot list $r_j$ of assistance criteria items stored on the computer readable memory, an index j identifying a corresponding one of the plurality of n robots;
a ranking application executed by the processor to generate, based on the plurality of m worker lists $w_i$ and the plurality of n robot lists $r_j$, a set Y of parameters $y_{ij}$ where each parameter $y_{ij}$ represents a score associated with providing an assistance request to the $i^{th}$ worker to assist the $j^{th}$ robot, the relative magnitudes of the parameters $y_{ij}$ within the set Y determining a relative ranking of the parameters $y_{ij}$;
a notification application executed by the processor for providing, based on the set Y of parameters, at least one selected worker with an assistance request from at least one selected robot;
wherein the ranking application generates the set Y of parameters using a machine learning algorithm and each parameter $y_{ij}$ represents a probability associated with providing the $i^{th}$ worker with an assistance request from the $j^{th}$ robot.

2. A system according to claim 1 wherein:
the at least one selected worker comprises a single selected worker and the at least one selected robot comprises a single selected robot;
the ranking application selects the single selected worker and the single selected robot with the highest magnitude parameter $y_{ij}$ from among the set Y of parameters; and
the notification application provides the single selected worker with an assistance request from the single selected robot and causes the processor to re-execute the ranking application with the single selected worker removed from the plurality of workers and the single selected robot removed from the plurality of robots.

3. A system according to claim 1 wherein the machine learning algorithm comprises:
a first input layer $I_1$ and a second input layer $I_2$, the first input layer taking, as input, the worker lists $w_i$ (i=1 ... m) for the plurality of m workers and the second layer taking, as input, the robot lists $r_j$ (j=1 ... n) for the plurality of n robots;
a first hidden layer $L_1$ that normalizes each robot list $r_j$ using a first activation function $f_1$; and
a second hidden layer $L_2$ that normalizes each worker list $w_i$ using a second activation function $f_2$ that is based, at least in part on the worker list $w_i$ and output of the first hidden layer $L_1$.

4. A system according to claim 3 wherein the machine learning algorithm comprises an output layer $L_3$ that returns a probability $y_{ij}$ that forms a parameter of the set Y of parameters using a third activation function $f_3$ that is based, at least in part, on output of the second hidden layer $L_2$.

5. A system according to claim 4 wherein the first hidden layer $L_1$ has the form $$O(L_1)=f_1(\theta_1 r_j^T)$$

where $f_1$ is the first activation function and $\theta_1$ is a dynamic weight matrix that is updated in each iteration of the machine learning algorithm.

6. A system according to claim 5 wherein the second hidden layer $L_2$ has the form $$O(L_2)=f_2(\theta_{21}O(L_1)^T+\theta_{22}w_i^T)$$

where $f_2$ is the second activation function, $\theta_{21}$ and $\theta_{22}$ are dynamic weight matrices updated in each iteration of the machine learning algorithm and $O(L_1)$ is the output of the first hidden layer.

7. A system according to claim 6 wherein the first and second activation functions $f_1$ and $f_2$ comprise logistic activation functions having the form $$f_2(x) = f_1(x) = \frac{1}{1+e^{-x}}.$$

8. A system according to claim 6 wherein the first and second activation functions $f_1$ and $f_2$ comprise tan h activation functions have the form $$f_2(x) = f_1(x) = \tanh(x) = \frac{2}{1+e^{-2x}} - 1.$$

9. A system according to claim 5 wherein the output layer $L_3$ has the form $$y_{ij}=O(L_3)=f_3(\theta_3 O(L_2)^T)$$

where $f_3$ is the third activation function, $\theta_3$ is a dynamic weight matrix updated in each iteration of the machine learning algorithm and $O(L_2)$ is the output of the second hidden layer.

10. A system according to claim 9 wherein the third activation function $f_3$ comprises a softmax activation function.

11. A system according to claim 9 wherein the third activation function $f_3$ comprises a softmax activation function having the form $$f_3(x_{ij}) = \frac{e^{x_{ij}}}{\sum_{m=1,n=1}^{M,N} e^{x_{mn}}}.$$

12. A system according to claim 4 wherein the machine learning algorithm comprises an error back propagation function E that is based, at least in part, on the distance $(d(w_i)-d(r_j))$ between the robot j and worker i.

13. A system according to claim 12 wherein the machine learning algorithm comprises an error back propagation function E having the form $$E(\theta)=(y_{ij}-\hat{y}_{ij}(r_j,w_i,\theta))^2 \times (d(w_i)-d(r_j))^2$$

where $\theta$ is a dynamic weight matrix updated in each iteration of the machine learning algorithm.

14. A system according to claim 4 wherein:
the at least one selected worker comprises a single selected worker and the at least one selected robot comprises a single selected robot;
the ranking application selects the single selected worker and the single selected robot with the highest probability $y_{ij}$ from among the set Y of probabilities; and
the notification application provides the single selected worker with an assistance request from the single selected robot and causes the processor to re-execute the ranking application with the single selected worker removed from the plurality of workers and the single selected robot removed from the plurality of robots.

15. A system according to claim 4 wherein the at least one selected worker comprises a plurality of selected workers and the at least one selected robot comprises a plurality of selected robots and wherein the ranking application further comprises an optimization application executed by the processor which optimally selects the plurality of selected workers and the plurality of selected robots over the plurality of m workers and the plurality of n robots using a computer-implemented optimization process based on the set Y of parameters.

16. A system according to claim 15 wherein the computer-implemented optimization process comprises performing a linear programming algorithm using an objective function having the form $$\Sigma_{i=0}^{n-1}\Sigma_{j=0}^{m-1}Y(i,j)X(i,j)$$

where X(i,j) is a binary matrix whose values are selected from only {0,1} and subject to constraints which ensure that each robot may provide an assistance request to only one worker and that each worker may be provided an assistance request from only one robot.

17. A system according to claim 16 wherein the constraints have the form:

$$\Sigma_{i=0}^{n-1}X(i,j)=1 \text{ for each } j=0,1,\ldots,m-1$$

and $$\Sigma_{j=0}^{m-1}X(i,j)=1 \text{ for each } i=0,1,\ldots,n-1.$$

* * * * *